United States Patent
Mohr et al.

(10) Patent No.: US 11,686,239 B2
(45) Date of Patent: Jun. 27, 2023

(54) SYSTEMS AND METHODS FOR EQUALIZING BACKPRESSURE IN ENGINE CYLINDERS

(71) Applicant: CUMMINS INC., Columbus, IN (US)

(72) Inventors: Daniel J. Mohr, Scipio, IN (US); Bogdan V. Pavlov, Redondo Beach, CA (US); Nikhil J. Ajotikar, Columbus, IN (US); Yi-Cheng Chen, Columbus, IN (US); David Eckroth, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/716,341

(22) Filed: Apr. 8, 2022

(65) Prior Publication Data
US 2022/0228521 A1 Jul. 21, 2022

Related U.S. Application Data

(62) Division of application No. 16/889,058, filed on Jun. 1, 2020, now Pat. No. 11,319,860, which is a division
(Continued)

(51) Int. Cl.
*F02M 26/05* (2016.01)
*F02M 26/17* (2016.01)
(Continued)

(52) U.S. Cl.
CPC ............. *F01N 13/10* (2013.01); *F01N 1/06* (2013.01); *F01N 13/107* (2013.01);
(Continued)

(58) Field of Classification Search
CPC ........ F02M 26/05; F02M 26/17; F02M 35/10; F02M 35/10026; F02M 35/10032;
(Continued)

(56) References Cited

U.S. PATENT DOCUMENTS

| 3,406,515 A | 10/1968 | Behrens |
| 3,994,270 A | 11/1976 | Nakano |

(Continued)

FOREIGN PATENT DOCUMENTS

| CN | 2685582 A | 3/2005 |
| CN | 201474768 | 5/2010 |

(Continued)

OTHER PUBLICATIONS

Yao Chunde, "Advanced Technology and Principles of Internal Combustion Engines", Tianjin University Press, 1st Edition, 2010, p. 138 (English Translation).

(Continued)

*Primary Examiner* — Audrey B. Walter
(74) *Attorney, Agent, or Firm* — Foley & Lardner LLP

(57) ABSTRACT

An intake manifold is provided. A first inlet is structured to receive pressurized intake air from a turbocharger. A second inlet is structured to receive exhaust gas recirculation gas from an exhaust gas recirculation system. A third inlet is structured to receive fuel from a fuel line. A plurality of outlets are structured to be fluidly coupled to an engine. An intake manifold passage extends between each of the first, second, and third inlets, and the plurality of outlets. The intake manifold passage is shaped so as to cause at least two reversals in flow direction of each of the intake air, the exhaust gas recirculation gas, and the fuel through the intake manifold passage so as to improve mixing of each of the intake air, the exhaust gas recirculation gas, and the fuel.

6 Claims, 33 Drawing Sheets

Related U.S. Application Data of application No. 16/073,117, filed as application No. PCT/US2017/016027 on Feb. 1, 2017, now Pat. No. 10,704,449.

(60) Provisional application No. 62/291,786, filed on Feb. 5, 2016.

(51) Int. Cl.

| | | |
|---|---|---|
| *F02M 35/10* | (2006.01) | |
| *F01N 13/10* | (2010.01) | |
| *F02B 37/02* | (2006.01) | |
| *F02M 26/14* | (2016.01) | |
| *F01N 1/06* | (2006.01) | |
| *F02M 26/42* | (2016.01) | |
| *F02M 35/104* | (2006.01) | |

(52) U.S. Cl.
CPC ........... *F02B 37/025* (2013.01); *F02M 26/14* (2016.02); *F02M 26/42* (2016.02); *F02M 35/10* (2013.01); *F02M 35/10032* (2013.01); *F02M 35/10039* (2013.01); *F01N 2260/06* (2013.01); *F01N 2260/14* (2013.01); *F01N 2260/16* (2013.01); *F01N 2340/00* (2013.01); *F02M 26/05* (2016.02); *F02M 26/17* (2016.02); *F02M 35/104* (2013.01); *F02M 35/10026* (2013.01); *F02M 35/10052* (2013.01); *F02M 35/10157* (2013.01); *F02M 35/10216* (2013.01); *F02M 35/10222* (2013.01); *Y02T 10/12* (2013.01)

(58) Field of Classification Search
CPC ....... F02M 35/10039; F02M 35/10052; F02M 35/10157; F02M 35/10216; F02M 35/10222; F02M 35/104
See application file for complete search history.

(56) References Cited

U.S. PATENT DOCUMENTS

| | | | |
|---|---|---|---|
| 4,288,988 A | 9/1981 | Curtil | |
| 4,545,605 A | 10/1985 | Gerber et al. | |
| 4,823,759 A * | 4/1989 | Mitani | F02M 35/10 |
| | | | 123/568.17 |
| 5,331,930 A | 7/1994 | McWhorter | |
| 5,572,868 A | 11/1996 | Okamoto et al. | |
| 5,915,365 A | 6/1999 | Meisinger | |
| 6,293,095 B1 | 9/2001 | Yamamoto | |
| 6,732,524 B2 | 5/2004 | Sponton | |
| 6,945,235 B1 | 9/2005 | Bertilsson et al. | |
| 7,287,373 B2 | 10/2007 | Matsuda | |
| 8,820,301 B2 | 9/2014 | Knafl et al. | |
| 8,839,759 B2 | 9/2014 | Riegger et al. | |
| 8,915,081 B2 | 12/2014 | Hayman et al. | |
| 2003/0129073 A1 | 7/2003 | Kim | |
| 2005/0067219 A1 | 3/2005 | Albertson | |
| 2005/0115231 A1 | 6/2005 | Ashida et al. | |
| 2011/0131963 A1 | 6/2011 | Reinhart et al. | |
| 2013/0306025 A1 | 11/2013 | Matsumoto et al. | |
| 2015/0247433 A1 | 9/2015 | Colette | |
| 2016/0222929 A1 * | 8/2016 | Luehrsen | B60T 17/02 |

FOREIGN PATENT DOCUMENTS

| | | | |
|---|---|---|---|
| CN | 202132096 A | | 2/2012 |
| CN | 103328783 A | | 9/2013 |
| CN | 212716902 U | * | 3/2021 |
| DE | 92 04 220 A | | 5/1992 |
| EP | 0 933 509 A1 | | 8/1999 |
| FR | 662165 A1 | | 8/1929 |
| FR | 860897 A1 | | 1/1941 |
| JP | 2013047506 A | * | 3/2013 |
| TW | M244364 U | | 9/2004 |
| WO | WO-9015923 A1 | * | 12/1990 |

OTHER PUBLICATIONS

First Office Action for CN Application No. 2021102034943, dated Mar. 28, 2022, (15 pages) (with English Translation).
Li Zhiguang et al., "Influence of Exhaust Manifold Structure on Engine Performance", Proceedings of the 2014 Chinese Society of Automotive Engineers Annual Conference, 2014, pp. 227-231 (with English abstract).
Chinese Office Action from CN 201780008561.8, dated Feb. 7, 2020.
European Search Report from corresponding EP Application No. 17748067, dated May 20, 2019, pp. 1-15.
International Search Report from corresponding PCT Application No. PCT/US2017/016027, dated May 24, 2017, pp. 1-4.
Non-Final Office Action from U.S. Appl. No. 16/073,117, dated Nov. 4, 2019.
Notice of Allowance from U.S. Appl. No. 16/073,117, dated Mar. 9, 2020.
Written Opinion from corresponding PCT Application No. PCT/US2017/016027, dated May 24, 2017, pp. 1-10.
Office Action for CN Patent Application No. 2021102034943, dated Nov. 25, 2022.
Zhiguang, Li, et al., "Effects of Exhaust Manifold Structure to Engine Performance," China Academic Journal Electronic Publishing House, 2014, pp. 227-231. (English Abstract).

* cited by examiner

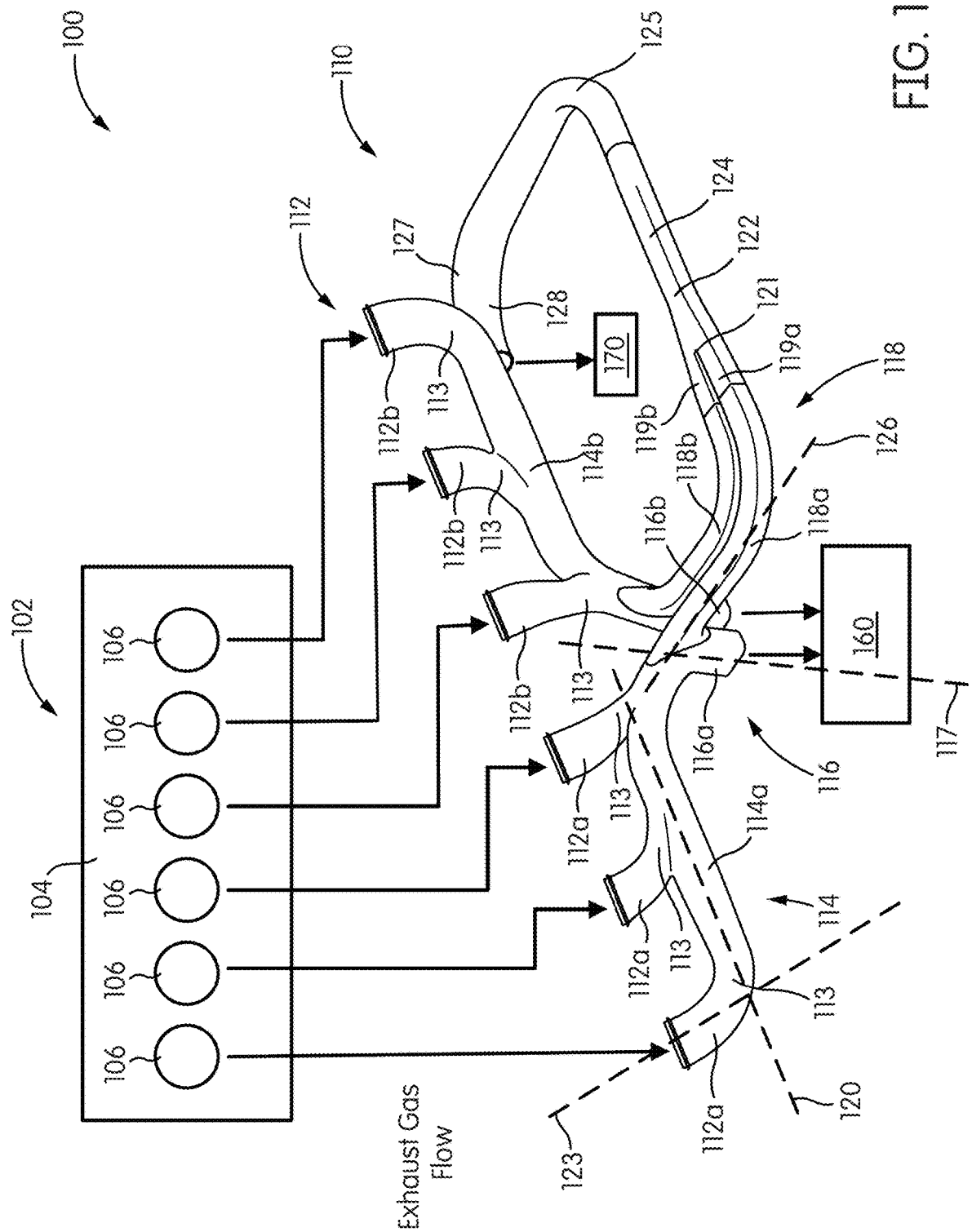

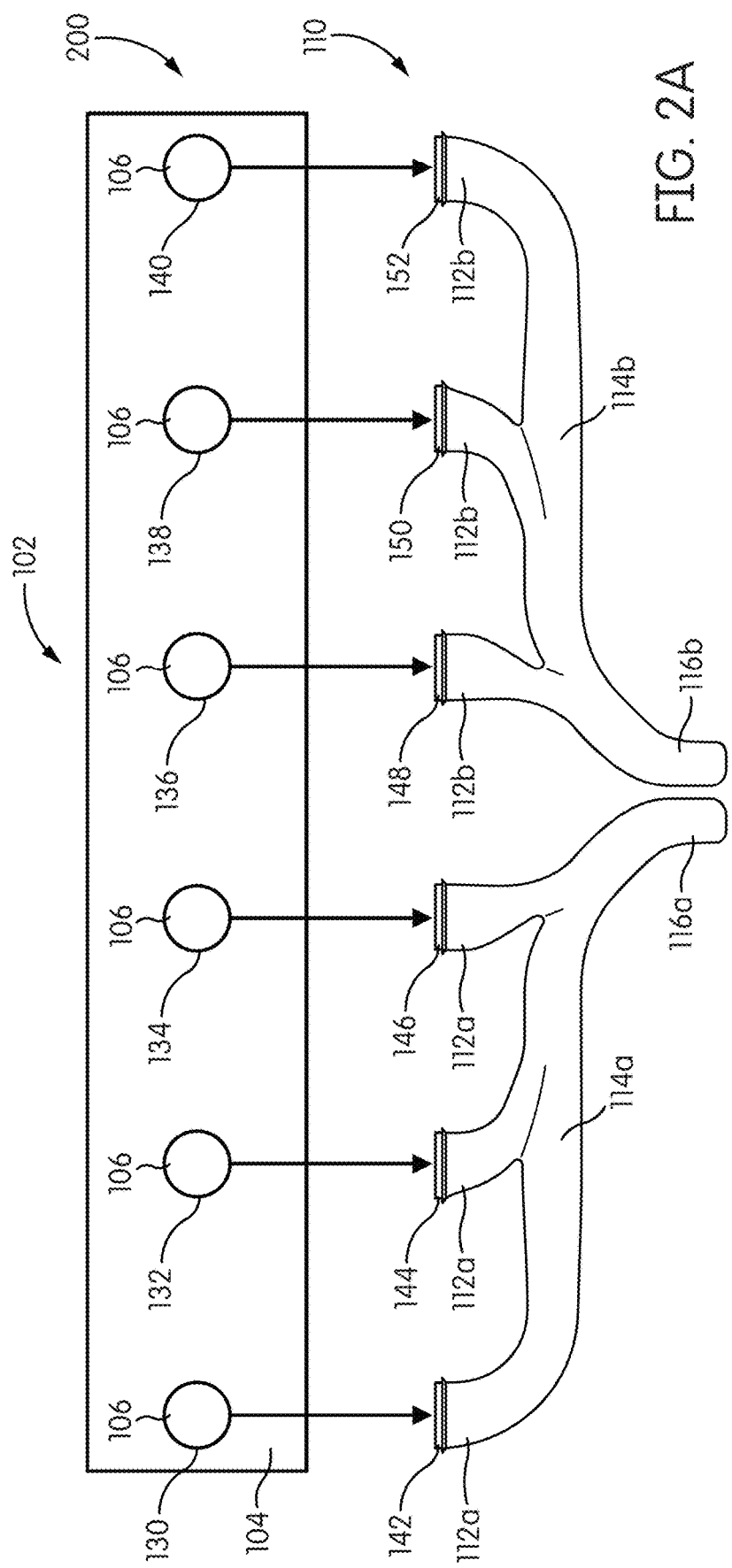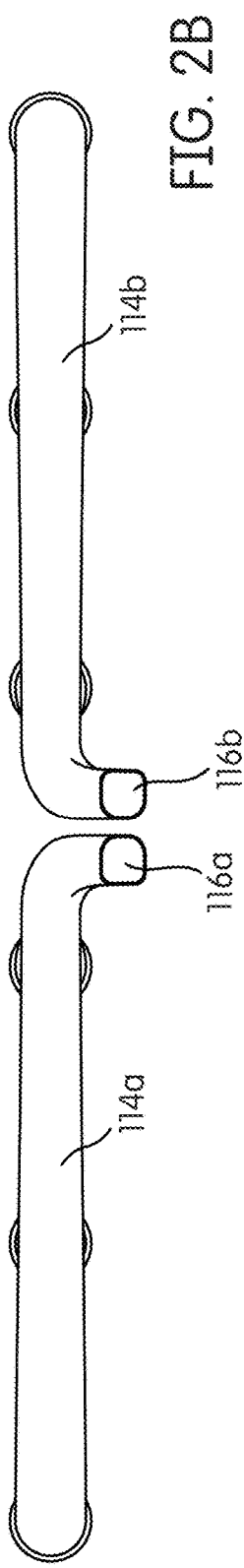
FIG. 2A
FIG. 2B

SYSTEMS AND METHODS FOR EQUALIZING BACKPRESSURE IN ENGINE CYLINDERS

CROSS-REFERENCE TO RELATED APPLICATIONS

This application is a divisional of U.S. patent application Ser. No. 16/889,058, filed on Jun. 1, 2020, which is a divisional of Ser. No. 16/073,117, filed on Jul. 26, 2018, which is the U.S. National Phase of PCT Application No. PCT/US2017/016027, filed on Feb. 1, 2017, which claims priority from U.S. Provisional Application No. 62/291,786, filed Feb. 5, 2016, the contents of which are incorporated herein by reference in their entireties.

TECHNICAL FIELD

The present disclosure relates generally to aftertreatment systems for use with internal combustion (IC) engines.

BACKGROUND

Exhaust aftertreatment systems are used to receive and treat exhaust gas generated by engines such as IC engines. Conventional exhaust gas aftertreatment systems include any of several different components structured to reduce the levels of harmful exhaust emissions present in exhaust gas. For example, certain exhaust aftertreatment systems for diesel-powered IC engines include a selective catalytic reduction (SCR) system which includes a catalyst formulated to convert $NO_x$ (NO and $NO_2$ in some fraction) into harmless nitrogen gas ($N_2$) and water vapor ($H_2O$) in the presence of ammonia ($NH_3$). A reductant is often inserted into exhaust conduits communicating the exhaust gas to the SCR system and/or other components of the aftertreatment system.

Natural gas as a fuel for heavy duty engines is receiving attention due to its potential to reduce pollutant and greenhouse gas emissions. Generally, natural gas engines comprise diesel engines converted to operate on natural gas, for example operating the diesel engine on natural gas using spark ignition (SI) stoichiometric parameters. For example, some natural gas engines may comprise diesel engines spanning a range from 6.5 L to 12 L in displacement converted to operate as natural gas engines. Such natural gas engines may be operated using stoichiometric combustion with cooled exhaust gas recirculation and three-way catalysis. However, simply converting diesel engines to operate on natural gas may cause the engine to experience high thermal stresses; relatively low efficiency due to low volumetric efficiency and compression ratio; unequal backpressure on engine cylinders, which may cause knock; and poor performance in terms of power and torque density, and transient response.

SUMMARY

Embodiments described herein relate generally to systems and methods for equalizing exhaust gas backpressure across a plurality of cylinders of an engine and, in particular, to exhaust manifolds structured to equalize backpressure of an exhaust gas across the plurality of cylinders of the engine.

In a first set of embodiments, an exhaust manifold comprises a plurality of exhaust intake conduits. Each of the plurality of exhaust intake conduits is structured to be fluidly coupled to an engine and structured to receive exhaust gas from a corresponding cylinder of the engine. At least one of the plurality of exhaust intake conduits may provide a reduction in an exhaust intake conduit cross-sectional area of the respective exhaust intake conduit from an exhaust intake conduit inlet to an exhaust intake conduit outlet of the respective exhaust intake conduits. The exhaust manifold also comprises a plurality of bends. Each of the plurality of bends is defined by a respective one of the exhaust intake conduit outlets. The exhaust manifold also comprises an exhaust intake manifold fluidly coupled to the exhaust intake conduit outlet of at least a portion of the plurality of exhaust intake conduits. Each of the plurality of bends is shaped so as to define an angle of approach of exhaust gas flowing through the respective exhaust intake conduit outlet. A first angle of approach of the first bend relative to the exhaust intake manifold flow axis is smaller than a second angle of approach of a second bend of the plurality of bends. The first bend is structured to receive exhaust gas from a first cylinder of the engine and the second bend is structured to receive exhaust gas from a second cylinder of the engine. The first cylinder is positioned in an outer position on the engine relative to the second cylinder.

In another set of embodiments, a system comprises an engine comprising a plurality of cylinders. Each of the plurality of cylinders is structured to burn a fuel so as to produce an exhaust gas. The system also includes an exhaust manifold comprising a plurality of exhaust intake conduits. Each of the plurality of exhaust intake conduits is structured to be fluidly coupled to an engine and structured to receive exhaust gas from a corresponding cylinder of the engine. The exhaust manifold also includes at least one exhaust intake manifold. The exhaust intake conduit outlet of at least a portion of the plurality of exhaust intake conduits is fluidly coupled to the at least one exhaust intake manifold. The exhaust manifold also includes a means for equalizing a pressure pulse amplitude caused by combustion in each of the plurality of cylinders.

In another set of embodiments, an exhaust manifold includes a first exhaust intake conduit structured to be fluidly coupled to an engine and structured to receive exhaust gas from a first cylinder of the engine. A second exhaust intake conduit is structured to be fluidly coupled to an engine and structured to receive exhaust gas from a second cylinder of the engine. The engine has a plurality of cylinders with the first cylinder being positioned in an outer position on the engine relative to the second cylinder. The first bend defines an oval-shaped cross-section. The first bend is shaped so as to define a first angle of approach of exhaust gas flowing through the first exhaust intake conduit outlet. A second bend is defined by a second exhaust intake conduit outlets of the second exhaust intake conduit. The second bend is shaped so as to define a second angle of approach of exhaust gas flowing through the second exhaust intake conduit outlet. An exhaust intake manifold is fluidly coupled to each of the first and second exhaust intake conduits. The exhaust intake manifold defines a first cross-sectional area proximate the first exhaust intake conduit and a second cross-sectional area proximate the second exhaust intake conduit. The first cross-sectional area is larger than the second cross-sectional area. The exhaust intake manifold defines an exhaust intake manifold flow axis. The first angle of approach relative to the exhaust intake manifold flow axis is smaller than the second angle of approach.

In another set of embodiments, an exhaust manifold includes a plurality of exhaust intake conduits. Each of the plurality of exhaust intake conduits is structured to be fluidly coupled to an engine and structured to receive exhaust gas from a corresponding cylinder of the engine. An exhaust intake manifold is fluidly coupled to an exhaust intake conduit outlet of at least one of the plurality of exhaust intake conduits. Each of the plurality of exhaust intake conduits and the exhaust intake manifold define an exhaust intake manifold core volume. Each of the plurality of exhaust intake conduits and the exhaust intake manifold are shaped so as to define the exhaust intake manifold core volume based on each of the displacement of the engine, the intended operating power of the engine, and the intended flow rate of the exhaust gas through the exhaust manifold.

In another set of embodiments, an intake manifold includes a first inlet structured to be fluidly coupled to a turbocharger so as to receive pressurized intake air from the turbocharger. A second inlet is structured to be fluidly coupled to an exhaust gas recirculation (EGR) system so as to receive EGR gas from the EGR system. A third inlet is structured to be fluidly coupled to a fuel line so as to receive fuel from the fuel line. A plurality of outlets are structured to be fluidly coupled to an engine. An intake manifold passage extends between each of the first, second, and third inlets, and the plurality of outlets. The intake manifold passage is shaped so as to cause at least two reversals in flow direction of each of the intake air, the EGR gas, and the fuel through the intake manifold passage so as to improve mixing of each of the intake air, the EGR gas, and the fuel.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 1 is a schematic illustration of system including an exhaust manifold, according to an embodiment.

FIG. 2A is a side view and FIG. 2B is a bottom view of at least a portion of the exhaust manifold of FIG. 1.

Figure 2C:
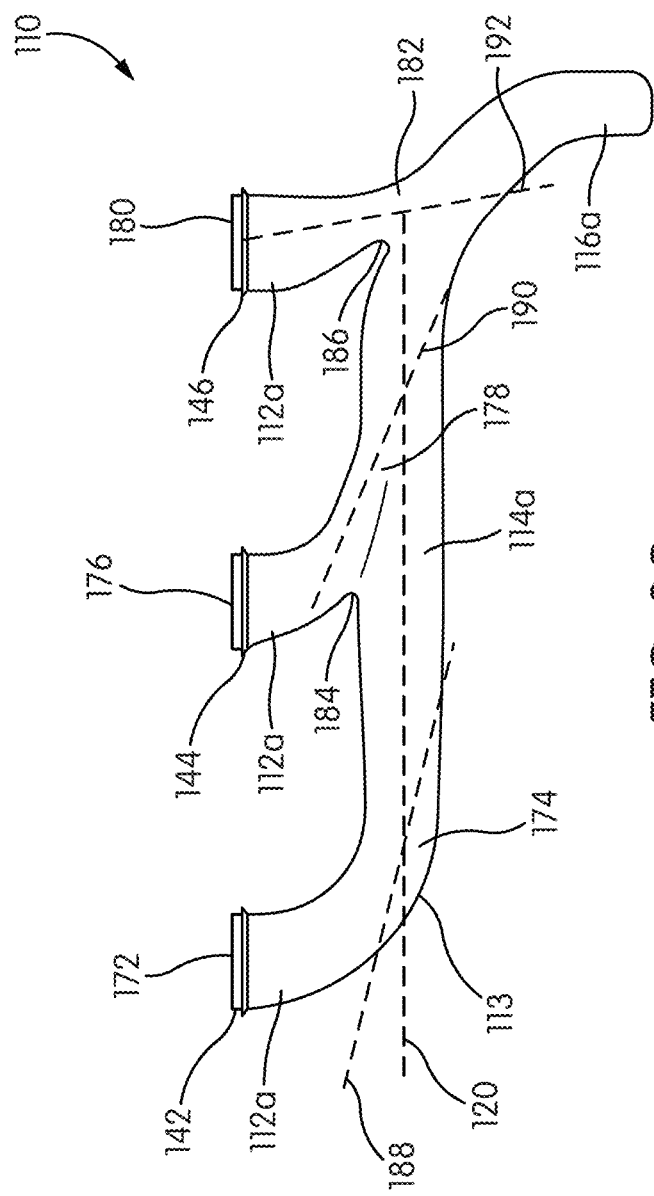
FIG. 2C is a side view of a portion of the exhaust manifold of FIGS. 2A and 2B.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for equalizing exhaust gas backpressure across a plurality of cylinders of an engine and, in particular, to exhaust manifolds structured to equalize backpressure of an exhaust gas across the plurality of cylinders of the engine.

Natural gas as a fuel for heavy duty engines is receiving attention due to its potential to reduce pollutant and greenhouse gas emissions. Generally, natural gas engines comprise diesel engines converted to operate on natural gas, for example operating the diesel engine on natural gas using SI stoichiometric parameters. For example, some natural gas engines may comprise diesel engines spanning a range from 6.5 L to 12 L in displacement converted to operate as natural gas engines. Such natural gas engines may be operated using stoichiometric combustion with cooled exhaust gas recirculation and 3-way catalysis.

However, simply converting diesel engines to operate on natural gas may cause the engine to experience high thermal stresses; relatively low efficiency due to low volumetric efficiency and compression ratio; unequal backpressure on engine cylinders which may cause knock; and poor performance in terms of power and torque density, and transient response. For example, the backpressure exerted by the exhaust gas flowing out of individual cylinders of engines (e.g., natural gas engines converted from diesel engines) may vary across the plurality of cylinders. This may lead to inconsistent temperatures across the plurality of cylinders, which may cause at least a portion of the plurality of cylinders included in the engine to run "hot" (e.g., at a temperature exceeding a design temperature of the respective cylinder). This can cause engine "knock" or pre-ignition, which further reduces the efficiency of the engine.

Various embodiments of the systems and methods described herein may provide benefits over conventional engine systems, including, for example: (1) equalizing pressures across cylinders, such as via an exhaust manifold structured to equalize a backpressure exerted by the exhaust gas on each of a plurality of cylinders of an engine; (2) maintaining a consistent temperature across all of the plurality of cylinders of the engine so as to reduce knock, thereby increasing engine efficiency; (3) providing continuous area reduction of exhaust gas flow to a turbine fluidly coupled to the engine so as to maintain exhaust gas momentum and reduce flow losses; (4) aligning a trajectory of the exhaust gas flow into an EGR system so as to maximize momentum recovery into the EGR flow path; and (5) defining cross-sections structured to maintain attachment of the exhaust gas flow to walls of the exhaust manifold or components thereof, thereby reducing turbulence and/or momentum losses.

FIG. 1 is a schematic illustration of a system 100, according to an embodiment. The system 100 comprises an engine 102, an exhaust manifold 110, and optionally a turbine 160 and an EGR assembly 170.

The engine 102 comprises an engine block 104 within which a plurality of cylinders 106 are defined. Each of the plurality of cylinders 106 is structured to burn fuel (e.g., natural gas) so as to produce an exhaust gas. The engine 102 may include a diesel engine, a natural gas engine, a gasoline engine, a biodiesel engine, an LPG engine, a dual-fuel engine, or any other suitable engine. In particular embodiments, the engine 102 may include a diesel engine converted to operate on natural gas. In other embodiments, the engine 102 is specifically designed to operate on natural gas.

The exhaust manifold 110 is fluidly coupled to the engine 102 and structured to receive the exhaust gas from the engine 102. The exhaust manifold 110 is structured to equalize a pressure pulse amplitude caused by combustion in each of the plurality of cylinders 106 of the engine 102. This is also referred to herein as equalizing a backpressure exerted by the exhaust gas on each of the plurality of cylinders 10. As used herein, the term "equalize" refers to achieving less than 10% variation in pressure pulse amplitudes in the exhaust manifold 110 caused by combustion in each of the plurality of cylinders 106. In particular implementations, the exhaust manifold 110 is structured such that equalizing pressure pulse amplitude achieves less than 5% variation between cylinders 106. In further implementations, the exhaust manifold 110 is structured such that equalizing pressure pulse amplitude achieves less than 3% variation between cylinders 106. In some embodiments, the exhaust manifold 110 may also cause a temperature of each of the plurality of cylinders 106 to be substantially the same (e.g., within +/−5% to +/−10% of each other, inclusive of all ranges and values therebetween). The consistent pressure and temperature across the plurality of cylinders 106 may reduce knock, thereby minimizing losses in the efficiency of the engine 102.

Expanding further, the exhaust manifold 110 may comprise a plurality of exhaust intake conduits 112. Each of the plurality of exhaust intake conduits 112 is structured to be fluidly coupled to the engine 102 and structured to receive exhaust gas from a corresponding cylinder 106 of the engine 102. Each of the plurality of exhaust intake conduits 112 may provide a reduction in an exhaust intake conduit cross-sectional area of the exhaust intake conduit 112 from an exhaust intake conduit inlet to an exhaust intake conduit outlet thereof. The exhaust manifold 110 also comprises at least one exhaust intake manifold 114. The exhaust intake conduit outlet of at least a portion of the plurality of exhaust intake conduits 112 is fluidly coupled to the at least one exhaust intake manifold 114.

For example, as shown in FIG. 1 and FIGS. 2A-C, the exhaust manifold 110 may comprise a first exhaust intake manifold 114a and a second exhaust intake manifold 114b (collectively referred to as "the exhaust intake manifolds 114"). The exhaust manifold 110 may also comprise a first set of exhaust intake conduits 112a and a second set of exhaust intake conduits 112b (collectively referred to herein as the "exhaust intake conduits 112"). The first set of exhaust intake conduits 112a is fluidly coupled to the first exhaust intake manifold 114a and structured to receive exhaust gas from a first portion of the plurality of cylinders 106. Furthermore, the second set of exhaust intake conduits 112b are fluidly coupled to the second exhaust intake manifold 114b and structured to receive exhaust gas from a second portion of the plurality of cylinders 106.

A cross-section of the exhaust intake conduit inlet may be larger than a cross-section of the exhaust intake conduit outlet, thereby causing the exhaust intake conduit cross-sectional area of each of the exhaust intake conduits 112 to decrease from the exhaust intake conduit inlet to the exhaust intake conduit outlet thereof. This may accelerate the exhaust gas flow towards the exhaust intake manifolds 114, thereby preventing any loss in momentum or pressure of the exhaust gas as it flows into the exhaust intake conduits 112.

In some embodiments, the exhaust intake conduit outlet of each of the plurality of exhaust intake conduits 112 comprises a bend 113 where it is coupled to the corresponding exhaust intake manifold 114. Moreover, in some embodiments, the exhaust intake conduit outlet of at least one the plurality of exhaust intake conduits 112 defines a non-circular cross-section (e.g., an elliptical or oval-shaped cross-section), for example at the bend 113. The non-circular cross-section may prevent the exhaust gas from separating from inner surfaces of sidewalls of the exhaust intake conduits 112 as the exhaust gas enters the exhaust intake manifolds 114, thereby preventing flow losses.

The reduction in the cross-sectional area of the exhaust intake conduits 112 and/or the bends 113 provided therein may serve to equalize a backpressure exerted by the exhaust gas on each of the plurality of cylinders 106. This may also cause a temperature in each of the plurality of the cylinders 106 to be substantially the same, thereby reducing knock.

In some embodiments, the exhaust intake manifolds 114 may also define a cross-sectional area that reduces from a portion where the exhaust gas enters the exhaust intake manifolds 114 to a portion where the exhaust gas exits the exhaust intake manifold 114. The reducing cross-sectional area of the exhaust intake manifold 114 may further facilitate equalizing of a backpressure exerted by the exhaust gas on each of the plurality of cylinders 106, for example by preventing momentum losses of the exhaust gas.

A first outlet port 116a and a second outlet port 116b (collectively referred to herein as "the outlet ports 116") may be fluidly coupled to the first exhaust intake manifold 114a and the second exhaust intake manifold 114b. Each of the outlet ports 116 defines an outlet port flow axis 117, which is positioned orthogonal (e.g., at an angle in the range of 60 degrees to 120 degrees inclusive of all ranges and values therebetween) to an exhaust intake manifold flow axis 120 of the exhaust intake manifolds 114. In some embodiments, the outlet port flow axis 117 may be parallel to and/or in line with an exhaust intake conduit flow axis 123 of the plurality of exhaust intake conduits 112 so as to minimize the number of turns the exhaust gas experiences from the exhaust intake conduits 112 to the turbine 160.

The outlet ports 116 may provide a reduction in an outlet port cross-sectional area of the outlet ports 116 from an outlet port inlet to an outlet port outlet of each of the outlet ports 116. Furthermore, each of the outlet ports 116 may define a non-circular (e.g., an elliptical or oval-shaped) cross-section. The reduction in cross-sectional area and/or the elliptical or oval cross-section of the outlet ports 116 may also serve to equalize the backpressure exerted by the exhaust gas on each of the plurality of cylinders 106.

The outlet ports 116 may be fluidly coupled to the turbine 160 (e.g., a turbine included in a turbocharger). The reducing cross-sectional area and/or the elliptical or oval cross-section of the outlet ports 116 may provide uniform flow of the exhaust gas into the turbine 160. The first outlet port 116a and the second outlet port 116b may provide a fully divided flow of the exhaust gas received from the respective first set and the second set of the plurality of cylinders 106 to the turbine 160, which may also serve to equalize the backpressure of the exhaust gas on each of the plurality of cylinder 106.

In some embodiments, at least one pull-off conduit may be fluidly coupled to the at least one exhaust intake manifold 114. At least a portion of the at least one pull-off conduit may define a pull-off conduit flow axis 126 positioned orthogonal to each of the exhaust intake manifold flow axis 120 and the outlet port flow axis 117. In various embodiments, a pull-off conduit first portion of the at least one pull-off conduit may define a reducing pull-off conduit cross-sectional area from a pull-off conduit first portion inlet to a pull-off conduit first portion outlet of the pull-off conduit first portion.

For example, as shown in FIG. 1, the exhaust manifold 110 may include a first pull-off conduit 118a and a second pull-off conduit 118b (collectively referred to herein as "the pull-off conduits 118") fluidly coupled to the first exhaust intake manifold 114a and the second exhaust intake manifold 114b, respectively.

At least a portion of the pull-off conduits 118 which is fluidly coupled to the exhaust intake manifolds 114 may be positioned orthogonal (e.g., at an angle in the range of 60 degrees to 120 degrees, inclusive of all ranges and values therebetween) to each of the exhaust intake manifold flow axis 120 of the exhaust intake manifolds 114 and the outlet port flow axis 117 of the outlet ports 116. For example, the pull-off conduits 118 may be positioned orthogonal to the exhaust intake manifolds 114 in a first plane (e.g., in an X-Y plane) and orthogonal to the outlet ports 116 in a second plane (e.g., in a Y-Z plane).

A pull-off conduit first portion 119a/b of the pull-off conduits 118a/b may define a reducing pull-off conduit cross-sectional area from a pull-off conduit first portion inlet to a pull-off conduit first portion outlet of the pull-off conduit first portion 119a/b. The reducing cross-sectional area may serve to maintain the momentum of the exhaust gas flowing through the pull-off conduit first portion 119a/b, thereby reducing flow losses.

The pull-off conduit first portion 119a/b of the pull-off conduits 118a/b are fluidly coupled to each other at a joint 121 so as to define a single flow path for the exhaust gas downstream of the joint 121. The single flow path reduces in cross-sectional area until it reaches a pull-off conduit first portion outlet 122 or throat. The sidewalls of the first portion 119a/b of the pull-off conduits 118a/b are joined with each other at the joint 121 at a sufficiently small angle (e.g., less than 5 degrees) so that the portions of the exhaust gas flowing into the joint 121 towards the pull-off conduit first portion outlet 122 from each of the pull-off conduit first portions 119a/b may experience minimal turbulence and smoothly mix with each other. A cross-sectional area of the pull-off conduit first portion outlet 122 may be optimized so as to prevent the exhaust gas from experience sudden momentum of flow losses, which may change the backpressure exerted by the exhaust gas on one or more of the plurality of cylinders 106.

The exhaust manifold 110 may also include a diffuser 128. The diffuser 128 may have a larger cross-sectional area relative to a cross-sectional area of the pull-off conduits 118 so as to reduce a velocity of the exhaust gas flowing therethrough, expand the exhaust gas, and/or reduce a temperature thereof. The diffuser 128 may be coupled to an EGR assembly 170, which may be structured to communicate the portion of the exhaust gas entering the pull-off conduits 118 to the plurality of cylinders 106, for example, to cool the combustion temperature of the air/fuel mixture therein (e.g., to reduce knock).

The pull-off conduits 118 may include a pull-off conduit second portion 124 fluidly coupled to each of the diffuser 128 and the pull-off conduit first portion outlet 122. The pull-off conduit second portion 124 may define an expanding cross-sectional area from the pull-off conduit first portion outlet 122 to a pull-off conduit second portion outlet of the pull-off conduit second portion 124. The pull-off conduit second portion outlet is fluidly coupled to the diffuser 128.

The expanding cross-sectional area of the pull-off conduit second portion 124 may provide smooth reduction in pressure and flow velocity of the exhaust gas from the pull-off conduits 118 to the diffuser 128. This may prevent vortices, flow losses, or sudden variations in backpressure of the exhaust gas. The pull-off conduit second portion 124 may also include a first bend 125 and a second bend 127 leading to the diffuser 128. The first bend 125 and the second bend 127 may define an elliptical or oval cross-section which may cause the exhaust gas flow to remain attached to an inner surface of the sidewalls of the pull-off conduit second portion 124, thereby preventing flow losses.

In some embodiments, an upstream portion of the pull-off conduit second portion 124 may define a smaller change in cross-sectional area from an inlet to an outlet thereof, relative to a downstream portion of the pull-off conduit second portion 124. The smaller change in cross-sectional area of the upstream portion relative to the downstream portion may provide a controlled reduction in exhaust gas momentum and velocity leading to the diffuser 128 so as to prevent sudden changes in backpressure of the exhaust gas.

FIG. 2A is a side view of at least a portion of the engine 102 and the exhaust manifold 110 of FIG. 1. FIG. 2B is a bottom view of at least a portion of the exhaust manifold 110 of FIG. 1. As illustrated in FIG. 2A, the cylinders 106 of the engine 102 include a first cylinder 130, a second cylinder 132, a third cylinder 134, a fourth cylinder 136, a fifth cylinder 138, and a sixth cylinder 140. All of the cylinders 106 are arranged in the engine 102 in a line, with the first and sixth cylinders 130, 140 being positioned in an outer-most position on the engine 102, the third and fourth cylinders 134, 136 being positioned in an inner-most position on the engine 102, and the second and fifth cylinders 132, 138 being positioned in an intermediate position on the engine 102 between the outer-most and inner-most cylinders 106. As used herein, the terms "outer" and "inner," in regard to the position of the cylinders 106 on the engine 102, refers to the position of each of the cylinders 106 on the engine relative to the other cylinders 106. An outer-most cylinder 106 (e.g., the first cylinder 130) is positioned adjacent one other cylinder (e.g., the second cylinder 132). Inner cylinders (e.g., the second cylinder 132) are positioned adjacent two other cylinders (e.g., the first and third cylinders 130, 134).

Similarly, the exhaust intake conduits 112 of the exhaust intake manifolds 114 include a first exhaust intake conduit 142, a second exhaust intake conduit 144, a third exhaust intake conduit 146, a fourth exhaust intake conduit 148, a fifth exhaust intake conduit 150, and a sixth exhaust intake conduit 152. The first exhaust intake conduit 142 is structured to be fluidly coupled to the first cylinder 130; the second exhaust intake conduit 144 is structured to be fluidly coupled to the second cylinder 132; the third exhaust intake conduit 146 is structured to be fluidly coupled to the third cylinder 134; the fourth exhaust intake conduit 148 is structured to be fluidly coupled to the fourth cylinder 136; the fifth exhaust intake conduit 150 is structured to be fluidly coupled to the fifth cylinder 138; and the sixth exhaust intake conduit 152 is structured to be fluidly coupled to the sixth cylinder 140. Accordingly, the first and sixth exhaust intake conduits 142, 152 are positioned in an outer-most position on the engine 102; the third and fourth exhaust intake conduits 144, 148 are positioned in an inner-most position on the engine 102; and the second and fifth exhaust intake conduits 146, 150 are positioned in an intermediate position on the engine 102 between the outer-most and inner-most exhaust intake conduits 112. As mentioned above, at least one of the exhaust intake manifolds 114 define a cross-sectional area that reduces from a portion where the exhaust gas enters the respective exhaust intake manifolds 114 to a portion where the exhaust gas exits the respective exhaust intake manifolds 114. Additionally, in some embodiments, the exhaust intake manifolds 114 define cross-sectional areas that are different based on the intended position of the exhaust intake manifolds 114 on the engine 102. For example, in some embodiments, the exhaust intake manifolds 114 define a cross-sectional area that reduces from an outer-most position to an inner-most position, as defined based on the intended configuration of the exhaust intake manifolds 114 when installed on the engine 102. This is most clearly shown in FIG. 2B. In other words, the exhaust intake manifolds 114 define a larger cross-sectional area proximate an outer cylinder 106 than proximate an inner cylinder 106. For example, in some embodiments, the first exhaust intake manifold 114*a* defines a first cross-sectional area proximate the first exhaust intake conduit 142 and a second cross-sectional area proximate the third exhaust intake conduit 146, the second cross-sectional area being smaller than the first cross-sectional area.

FIG. 2C is a side view of a portion of the exhaust manifold 110 of FIGS. 2A and 2B. As mentioned above, the exhaust manifold 110 includes several design features that are implemented to achieve various design objectives, such as equalizing a backpressure exerted by the exhaust gas on each of a plurality of cylinders of the engine 102 or equalizing a pressure pulse amplitude at a point in the exhaust manifold 110 (e.g., proximate the outlet ports 116) caused by combustion in each of the plurality of cylinders of the engine 102. Another design objective is to maximize the total pressure of the exhaust gas so as to optimize operation of the turbine 160 and the EGR assembly 170. For example, in some embodiments, the shape of various portions of each of the exhaust intake conduits 112 and the exhaust intake manifolds 114 is defined so that exhaust gas flowing through the respective exhaust intake conduits 112 and exhaust intake manifolds 114 causes the same pressure pulse amplitude at a point in the exhaust manifold 110. In other words, the exhaust gas "acts the same" regardless of the cylinder from which it was expelled. Additionally, the shape of various portions of each of the exhaust intake conduits 112 and the exhaust intake manifolds 114 is defined so as to maximize the pressure of the exhaust gas flowing through the respective exhaust intake conduits 112 and exhaust intake manifolds 114.

As will be explained in further detail below, in some embodiments, at least three design parameters are defined so as to equalize the pressure pulse amplitude in the exhaust manifold 110. First, at least one of the bends of the respective exhaust intake conduit outlets has a non-circular (e.g., oval or elliptical) cross-section. Second, at least one of the exhaust intake conduits defines a cross-sectional area that reduces from the exhaust intake conduit inlet to the exhaust intake conduit outlet. Third, each of the plurality of bends are shaped so as to define particular angles of approach of exhaust gas flowing through the respective exhaust intake conduit outlet. As will be appreciated, each of these design parameters was defined so as to achieve the design objectives.

As illustrated in FIG. 2C, each of the exhaust intake conduits 112 includes an exhaust intake conduit inlet and an exhaust intake conduit outlet. In operation, exhaust gas flows from the exhaust intake conduit inlet, through the exhaust intake conduit 112, out of the exhaust intake conduit outlet, and into the exhaust intake manifold 114. For example, as illustrated in FIG. 2A, the first exhaust intake conduit 142 includes a first exhaust intake conduit inlet 172 and a first exhaust intake conduit outlet 174; the second exhaust intake conduit 144 includes a second exhaust intake conduit inlet 176 and a second exhaust intake conduit outlet 178; and the third exhaust intake conduit 146 includes a third exhaust intake conduit inlet 179 and a third exhaust intake conduit outlet 182.

As also mentioned above, each of the exhaust intake conduit outlets 174, 178, 182 define a bend where the respective exhaust intake conduit outlets 174, 178, 182 is coupled to the exhaust intake manifold 114. For example, as illustrated in FIG. 2C, the first exhaust intake conduit outlet 174 defines the first bend 113, the second exhaust intake conduit outlet 178 defines a second bend 184, and the third exhaust intake conduit outlet 182 defines a third bend 186.

In some embodiments, at least one of the first, second, and third bends 113, 184, 186 defines a non-circular (e.g., oval or elliptical) cross-section. For example, in some embodiments, the first bend 113 defines a non-circular cross-section. In some embodiments, the second and third bends 184, 186 do not define a non-circular cross-section. In other embodiments, each of the first, second, and third bends 113, 184, 186 defines a non-circular cross-section.

In some embodiments, at least one of the exhaust intake conduits 112 defines a cross-sectional area that reduces from the exhaust intake conduit inlet to the exhaust intake conduit outlet. For example, in one embodiment, the third exhaust intake conduit 146 defines a cross-sectional area that reduces from the third exhaust intake conduit inlet 180 to the third exhaust intake conduit outlet 182. In some embodiments, the first exhaust intake conduit 142 defines a cross-sectional area that does not reduce from the first exhaust intake conduit inlet 172 to the first exhaust intake conduit outlet 174. In some embodiments, the exhaust intake conduits 112 that are configured to be positioned proximate inner cylinders on the engine 100 define a cross-sectional area that reduces from the exhaust intake conduit inlet to the exhaust intake conduit outlet to a greater extent than those exhaust intake conduits 112 positioned on outer cylinders of the engine 100.

In some embodiments, each of the exhaust intake conduits 112 include a cross-sectional area that defines an area schedule between the exhaust intake conduit inlet and the exhaust intake conduit outlet. For example, the first exhaust intake conduit 142 includes a first cross-sectional area that varies along its length, thereby defining a first area schedule between the first exhaust intake conduit inlet 172 and the first exhaust intake conduit outlet 174; the second exhaust intake conduit 144 includes a second cross-sectional area that defines a second area schedule between the second exhaust intake conduit inlet 176 and the second exhaust intake conduit outlet 178; and the third exhaust intake conduit 146 includes a third cross-sectional area that defines a third area schedule between the third exhaust intake conduit inlet 179 and the third exhaust intake conduit outlet 182. In some embodiments, the area schedules are defined by both the exhaust intake conduits 112 and the exhaust intake manifold 114. For example, in some embodiments, the first area schedule is defined by the cross-sectional diameter of the first exhaust intake conduit 142 from the first exhaust intake conduit inlet 172 to the first exhaust intake conduit outlet 174, and further to the first exhaust intake manifold 114a to a point proximate (e.g., upstream of) the first outlet port 116a.

In some embodiments, the first area schedule is linear. In other words, the cross-sectional area of the first exhaust intake conduit 142 decreases at a linear rate from a first cross-sectional diameter at the first exhaust intake conduit inlet 172 to a smaller second diameter at the first exhaust intake conduit outlet 174. In some embodiments, the second and third area schedules are non-linear. In other words, for example, the cross-sectional area of the second exhaust intake conduit 144 decreases from a first cross-sectional diameter at the second exhaust intake conduit inlet 176 to a smaller second diameter at the second exhaust intake conduit outlet 178 at a non-linear rate. The non-linear area schedule is most clearly shown by the third exhaust intake conduit 146. As shown in FIG. 2C, the "necking" at the third exhaust intake conduit outlet 182 causes the third area schedule to be non-linear due to the sharp reduction in cross-sectional diameter proximate the third bend 186.

The area schedules also define an exhaust intake manifold core volume. For example, in one embodiment, a first exhaust intake manifold core volume is the internal volume of the structure that defines the plurality of exhaust intake conduits 112a and the first exhaust intake manifold 114a of the exhaust manifold 110. In one embodiment, the first exhaust intake manifold core volume is the volume of the plurality of exhaust intake conduits 112a and the first exhaust intake manifold 114a upstream of the first outlet port 116a. In some embodiments, the exhaust manifold 110 is sized so as to define the exhaust intake manifold core volume relative to the displacement of the engine 100, based on a volume ratio. In other embodiments, the exhaust manifold 110 is sized based on other factors, such as intended operating power of the engine 100 or intended flow rate of exhaust gas through the exhaust manifold 110. For example, in some embodiments, the exhaust manifold 110 is sized larger for larger engine displacement, higher intended operating power, and/or higher intended exhaust gas flow rate.

Figure 3:
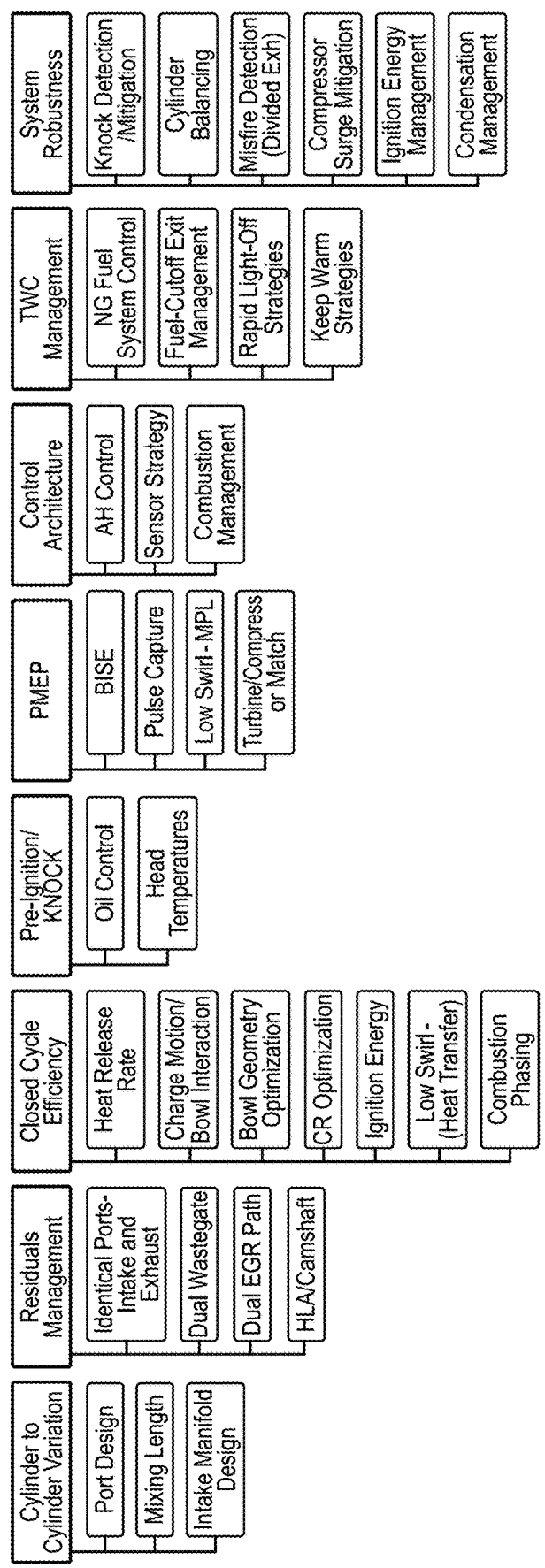
FIG. 3 is a schematic flow diagram of various operational parameters of a natural gas engine converted from a diesel engine which were altered to obtain high efficiency of the natural gas engine.

Each of the first, second, and third bends 113, 184, 186 are also shaped so as to define an angle of approach of exhaust gas flowing through the respective exhaust intake conduit outlet 174, 178, 182. The angles of approach may be defined, for example, relative to the exhaust intake manifold flow axis 120. For example, the first bend 113 is shaped so as to define a first angle of approach 188; the second bend 184 is shaped so as to define a second angle of approach 190; and the third bend 186 is shaped so as to define a third angle of approach 192. The angles of approach 188, 190, 192 are defined so as to minimize recirculation caused by the exhaust gas impacting the walls of the exhaust intake manifold 114. In some embodiments, the first angle of approach 188 is smaller than each of the second and third angles of approach 190, 192. In other words, in some embodiments, the angle of approach is smaller for exhaust intake conduits 112 structured to be positioned in outer positions on the engine 100. While FIGS. 1 and 2A-2B show an exhaust manifold structured to reduce exhaust gas back-pressure which may lead to reduced knock and increase in efficiency of the engine (e.g., a diesel engine converted into a natural gas engine) various other parameters and structures of the engine may also be structured to improve an efficiency of the engine. For example, FIG. 3 shows a family tree of various parameters of an engine that may be structured to increase an efficiency of an engine, for example a diesel engine converted into a natural gas engine.

Figure 4:
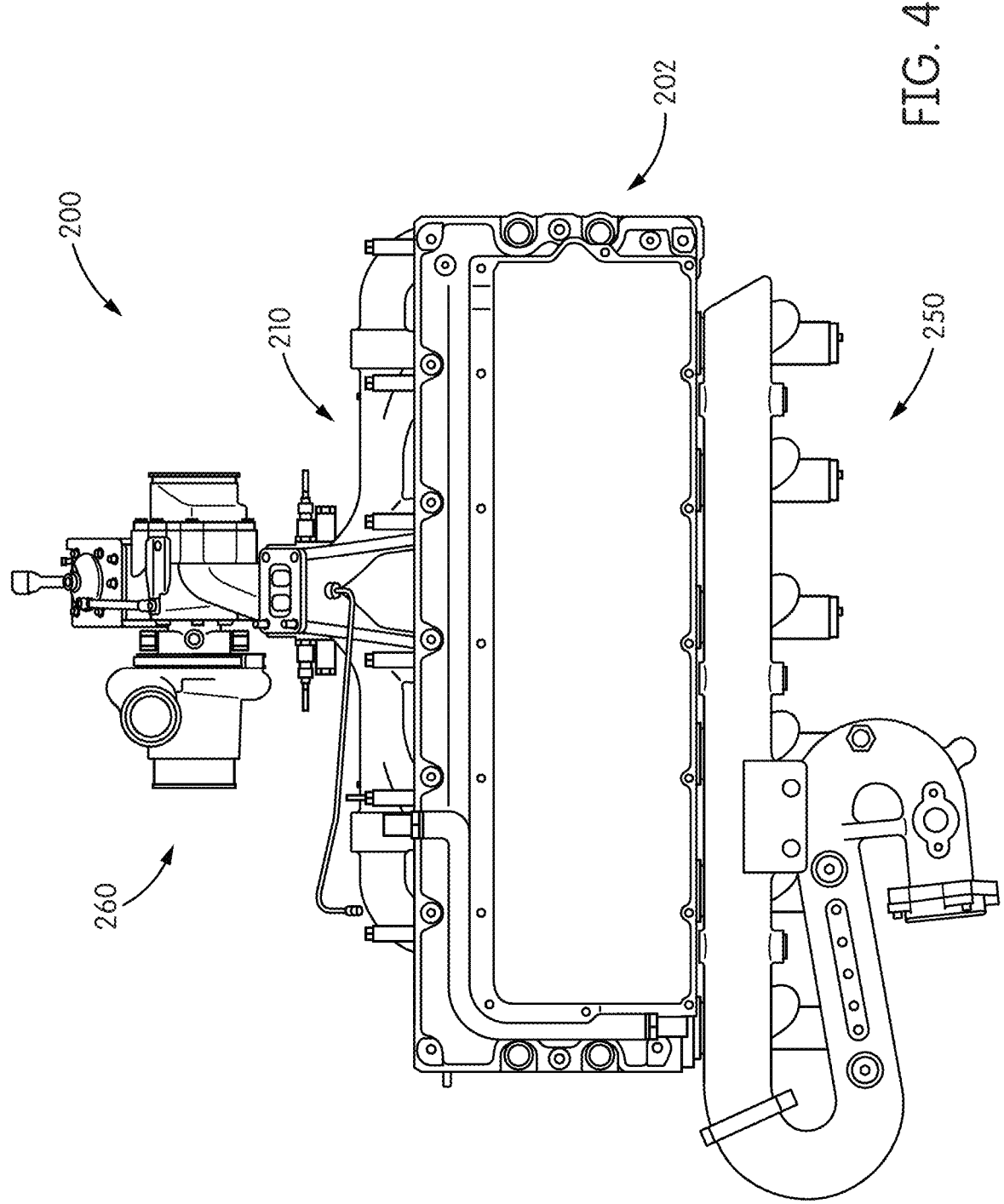
FIG. 4 is a top view of a system that includes an engine, an intake manifold and an exhaust manifold, according to an embodiment.

FIG. 4 is a top perspective view of a system 200, according to another embodiment. The system 200 includes an engine 202, an exhaust manifold 210, an intake manifold 250 and a turbine 260. In some embodiments, the engine 202 may include a 15 liter engine having six in-line cylinders having a bore of 137 mm and stroke of 169 mm, a power of up to 447 kW, and torque of up to 2.779 Nm at 1,200 rpm.

The exhaust manifold is fluidly coupled to the engine 202. The exhaust manifold 210 may be substantially similar to the exhaust manifold 110 (FIG. 1) and, therefore, not described in further detail herein. Various portions of the system 200 and their novel features which lead to an increase in efficiency of the engine 202 are described below.

Intake Manifold and Port Breathing

One objective of increasing engine 202 efficiency is to reduce variations in operational parameters from cylinder-to-cylinder and from cycle-to-cycle. The major contributors impacting efficiency of the engine 202 include the intake manifold 250, the exhaust manifold 210 and ports for more efficient air handling. The intake manifold 250 and the ports are structured so as to increase the efficiency of the engine 202. For example, the intake manifold 250 is structured so as to receive each of pressurized intake air from the turbocharger, EGR gas, and fuel injection. As shown in FIG. 4, the intake manifold 250 is "S-shaped" such that the intake charge air including EGR gas and fuel is subjected to at least two flow reversals before entering the engine 202, which improves constituent mixing of the intake charge air, the EGR gas, and the fuel.

In one embodiment, the intake manifold 250 includes a first inlet 251, a second inlet 253, and a third inlet 255. The first inlet 251 is structured to be fluidly coupled to a turbocharger 257 so as to receive pressurized intake air from the turbocharger 257. The second inlet 253 is structured to be fluidly coupled to an EGR system 258 so as to receive EGR gas from the EGR system 258. The third inlet 255 is structured to be fluidly coupled to a fuel line 259 so as to receive fuel from the fuel line 259. The intake manifold 250 also includes a plurality of outlets structured to be fluidly coupled to the engine 202. The intake manifold 250 further includes an intake manifold passage extending between each of the first, second, and third inlets, 251, 253, 255 and the plurality of outlets. The intake manifold passage is shaped so as to cause at least two reversals in flow direction of each of the intake air, the EGR gas, and the fuel through the intake manifold passage so as to improve mixing of each of the intake air, the EGR gas, and the fuel.

The intake ports may have a patterned design, and are exactly the same and all exhaust ports are exactly the same. The intake manifold 250 includes individual, drop-down runners from the plenum thereof to the intake ports thereof. All cylinders of the engine 202 pull off charge flow in exactly the same manner and there is no crosstalk between cylinders.

The intake manifold 250 provides a long mixing length so as to achieve flow uniformity. The intake ports of the intake manifold 250 are sufficiently large so as to reduce flow losses into the cylinder. Furthermore, exhaust ports of the exhaust manifold 210 are smaller for higher velocity flow to support the pulse EGR system 270 (see FIG. 7). The exhaust manifold 210 provides a fully divided, pulse capture flow to the EGR 270 and isolates the front bank from the rear bank. Moreover, the trajectory and area schedule of exhaust and EGR system components is optimized to reduce backpressure of the exhaust gas.

Figure 5B:
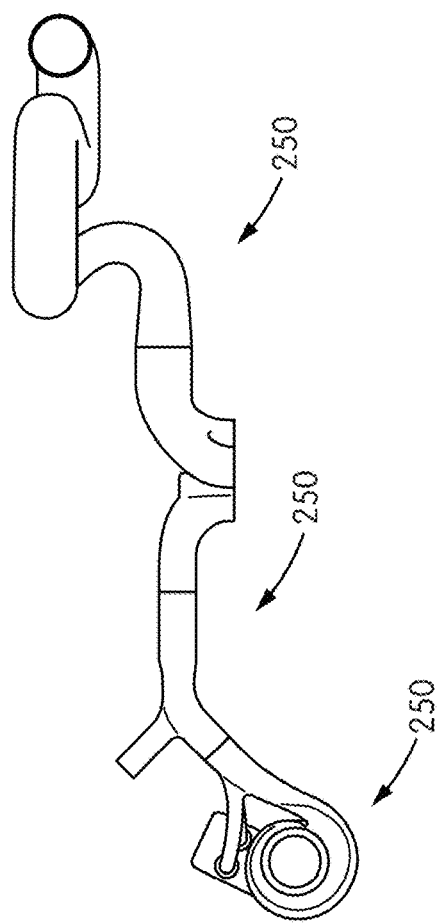
FIG. 5A is a top view and FIG. 5B is a front view of the intake manifold and the exhaust manifold included in the system of FIG. 4.
Figure 5A:
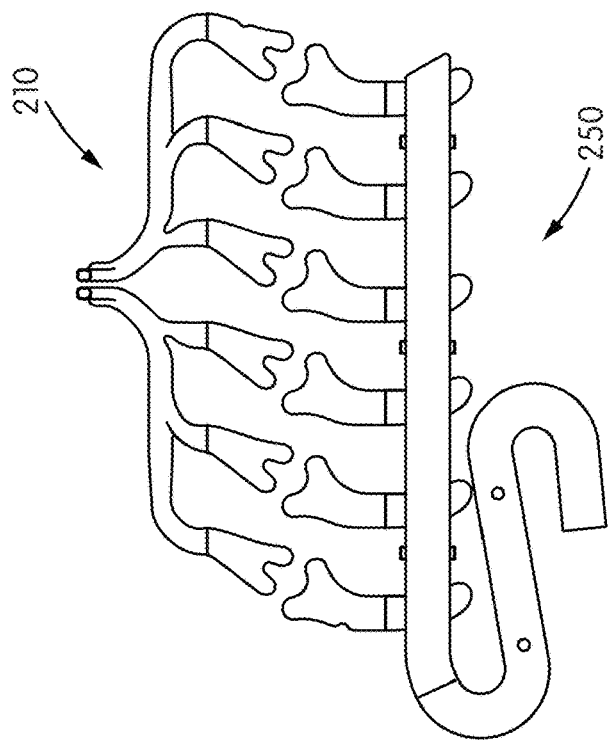
Figure 5C:
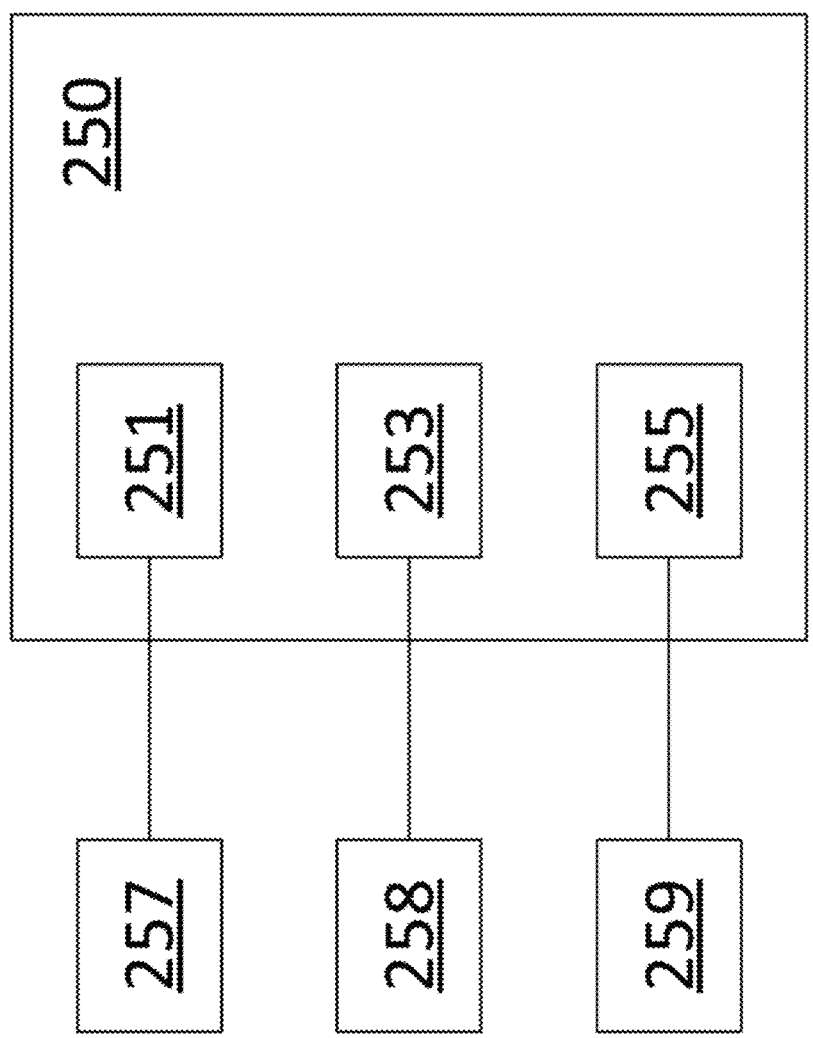
FIG. 5C is a schematic diagram of the exhaust manifold included in the system of FIG. 4.

The cylinder head of the engine 202 comprises a Big Intake Small Exhaust (BISE) diamond valve pattern. The diamond pattern allows for generation of swirl and the bigger intake valves enable bigger intake ports, contributing to improved engine breathing. The intake ports have high flow capability and low losses. The intake manifold may comprise a front end-inlet design with the plenum above the intake port center line, as shown in FIGS. 5A-B. Individual, equal length runners may pull off of the plenum to feed each cylinder of the engine 202 for consistent charge distribution. The runners may be angled towards the incoming charge where they connect to the plenum in order to help direct flow down the runners to feed each cylinder. The individual runners offer additional benefits such as further separation of cylinders, so as to reduce or eliminate fuel cross-talk with a Port Fuel Injection (PFI) architecture.

The exhaust ports also include the BISE diamond valve pattern. Smaller exhaust valves and ports result in higher exhaust flow velocities that positively affect performance of the pulse EGR system 270. The pulse EGR system 270 performance may be improved by efficient exhaust flow passages and junctions in order to minimize losses. The exhaust manifold 210 provided a drastically lower loss factor to the turbine 260 and EGR system 270.

Turbomachinery

Figure 6B:
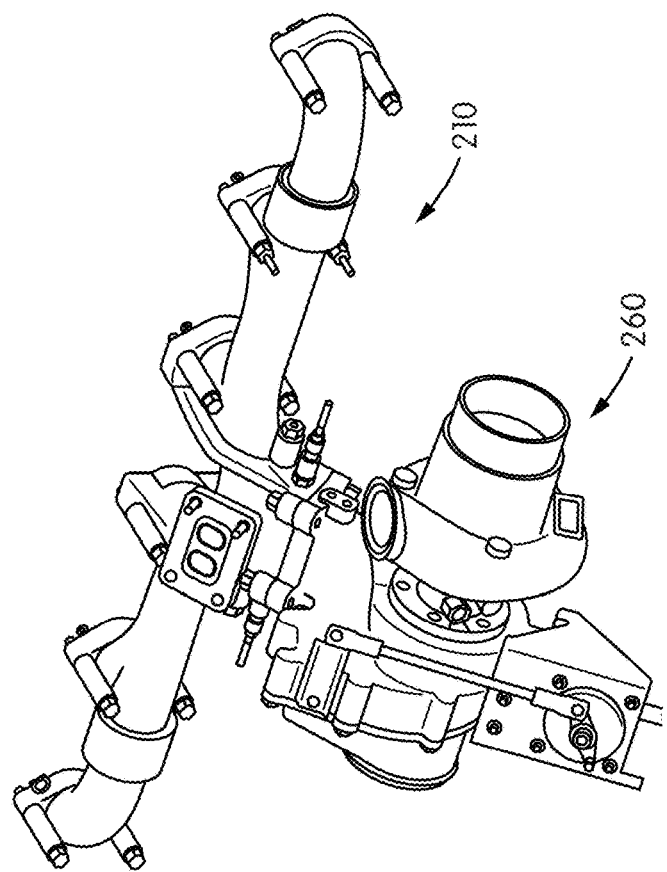
FIG. 6A is a perspective view of the exhaust manifold of the system of FIG. 3 fluidly coupled to a turbine and FIG. 6B shows the exhaust manifold and turbine with covers assembled thereon.
Figure 6A:
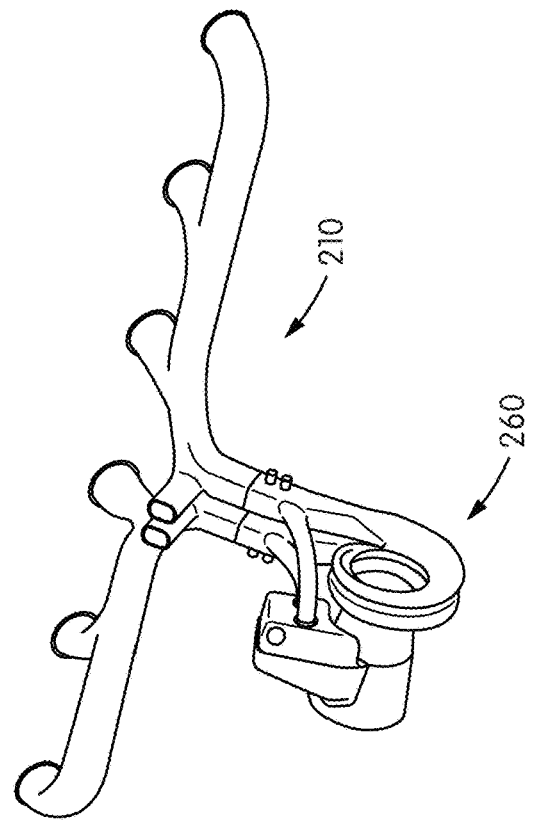

FIG. 6A is a perspective view of the exhaust manifold 210 of the system of FIG. 3 fluidly coupled to a turbine 260 and FIG. 6B shows the exhaust manifold 210 and turbine 260 assembled with covers positioned thereon. The turbine 260 is structured to provide every cylinder of the engine 202 the same experience and minimize loss coefficient. The loss coefficient may be minimized by optimizing the trajectory and the area schedule of the exhaust manifold 210.

Each cylinder of the engine 202 may be provided the same exhaust gas backpressure by maintaining fully divided flows up to the turbine 260. In some embodiments, the turbine may comprise a twin port electronically controlled waste gate to enable intake of exhaust gas flow from both banks of the exhaust manifold 210 (e.g., the plurality of outlet ports 116), further providing an identical breathing experience for all cylinders.

Exhaust Gas Recirculation

Figure 7:
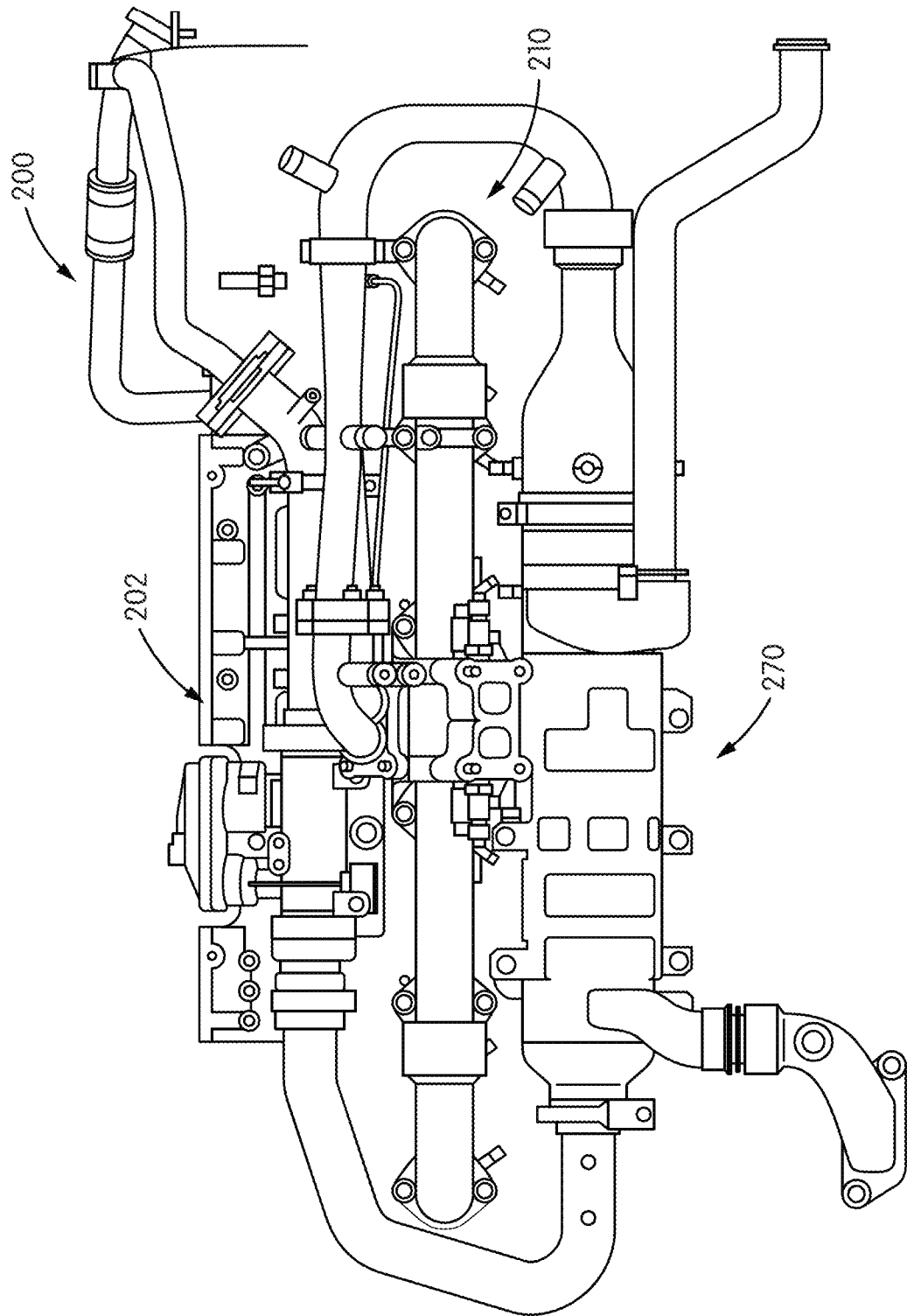
FIG. 7 is a perspective view of an EGR assembly included in the system of FIG. 3.

FIG. 7 is a perspective view of an EGR system 270 included in the system 200 of FIG. 3. The engine 202 operates with a stoichiometric air/fuel ration (AFR) and charge diluted with up to 25% EGR, while minimizing residuals. In addition to the exhaust manifold features already discussed, a very efficient flow junction to combine the flows may be implemented. The hot components of the EGR system 270 were developed concurrently and coupled to the exhaust manifold 210. Concurrent with CFD analysis of the flow domain, thermal mechanical fatigue analysis of the designs was also performed to ensure durability.

Oil Control

A stable spark-ignited architecture may be achieved by eliminating sources of knock and pre-ignition. One cause of knock and pre-ignition may include oil control and particularly from piston rings and valve stem seals. To address oil intrusion from the valve stem, a seal which is four times drier than conventional seals is used. The seal is also rated for vacuum, which may be beneficial on a throttled engine (e.g., the engine 202) which frequently operates with a vacuum in the intake manifold (e.g., the intake manifold 250). Oil intrusion past the piston rings of the cylinders was prevented using a three piece oil ring which has improved ring dynamics (compared to a two piece oil ring), therefore providing improved oil control.

Cylinder Head and Spark Plug Cooling

Figure 8B:
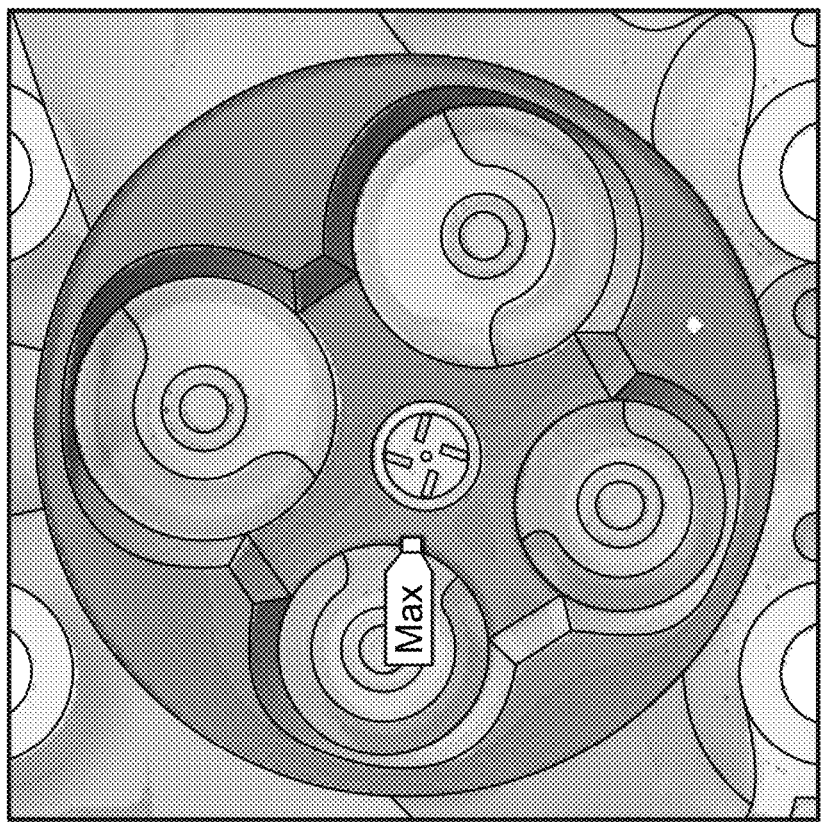
FIG. 8A-B are finite element analysis (FEA) models illustrating heat transfer coefficients in water jackets around valve seats, bridges and an ignitor core of a cylinder included in the engine of FIG. 3 (FIG. 8A) and predicted combustion face temperature and location of max temperature (FIG. 8B).
Figure 8A:
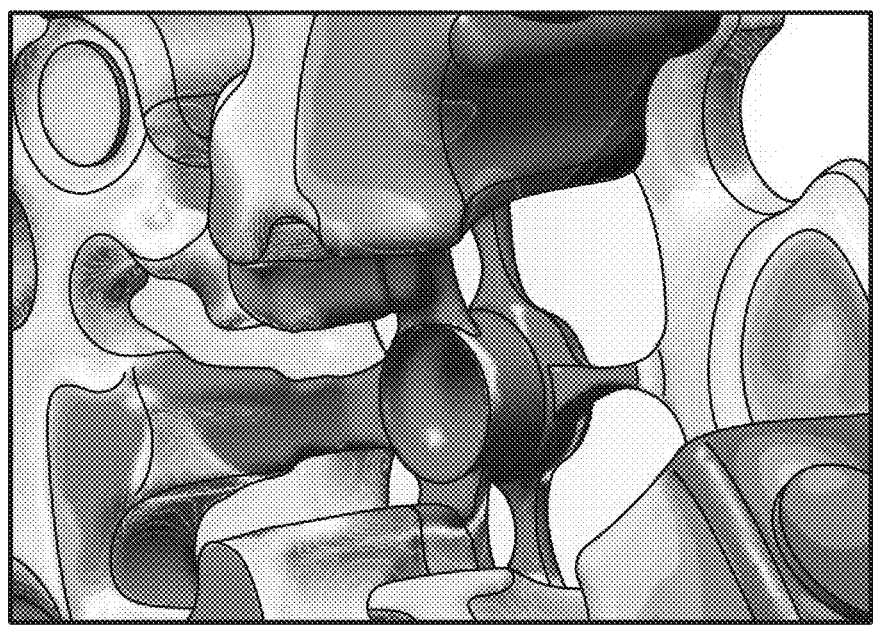

A potential source of pre-ignition addressed in various embodiments is an overheated spark plug. FIG. 8A-B are finite element analysis (FEA) models showing heat transfer coefficients in water jackets around valve seats, bridges and an ignitor core of a cylinder included in the engine of FIG. 3 (FIG. 8A) and predicted combustion face temperature and location of max temperature (FIG. 8B).

As seen in FIGS. 8A-B, the heat transfer coefficients are highest in the bridges and surrounding the entire ignitor bore. The engine ignitor bore is structured such that all of the coolant flows past the ignitor bores, thereby providing exceptional cooling to the spark plug. Furthermore, the combustion face, particularly edges, are also effectively cooled so as to prevent hot spots and pre-ignition. As shown in FIG. 8B, the combustion face is relatively cool. This not only prevents pre-ignition, it also ensures a durable and robust cylinder head with tolerance to brief periods of knock and temperature rise.

Fuel System

The engine 202 hardware allows placement of port fuel injectors in two possible locations and using two possible injectors. The injectors may be placed in the intake manifold 250 runners and/or above the intake ports in the cylinder head of the engine 202. In some embodiments, the engine 202 operates with 100% single point fuel injection (SPFI) or upstream mixed, or 100% multi point fuel injection (MPFI) injected in the individual ports. Additionally, in various embodiments, the engine 202 may run with any mix of SPFI and MPFI. Combustion CFD predicted a benefit to using a port fuel distribution tube and engine 202 testing proved this to be the case.

An additional benefit of locating the fuel injectors above the port is intake manifold over pressure (IMOP), that is, intake backfire mitigation. With a single point injection near the intake throttle, the entire intake manifold 250 contains a stoichiometric combustible mixture. With a MPFI system, most of the intake manifold 250 may be filled with air or possibly a very lean mixture beyond the ignition limits.

Compressor Bypass Valve

Stoichiometric gas engines are throttled by air (opposed to a diesel engine throttled by fueling) which may pose a challenge for the turbine 260 (e.g., a turbocharger compressor). When the engine 202 quickly transitions from a high boost condition to a no boost condition (tip-out), the throttle plate may slam shut and the high speed, high pressure charge between the compressor and the throttle may have to be relieved, otherwise the pressure may spike and find a low pressure path back through the compressor. This is known as compressor surge and may cause a loading reversal of the compressor blades, which may quickly lead to fatigue failures.

Figure 9:
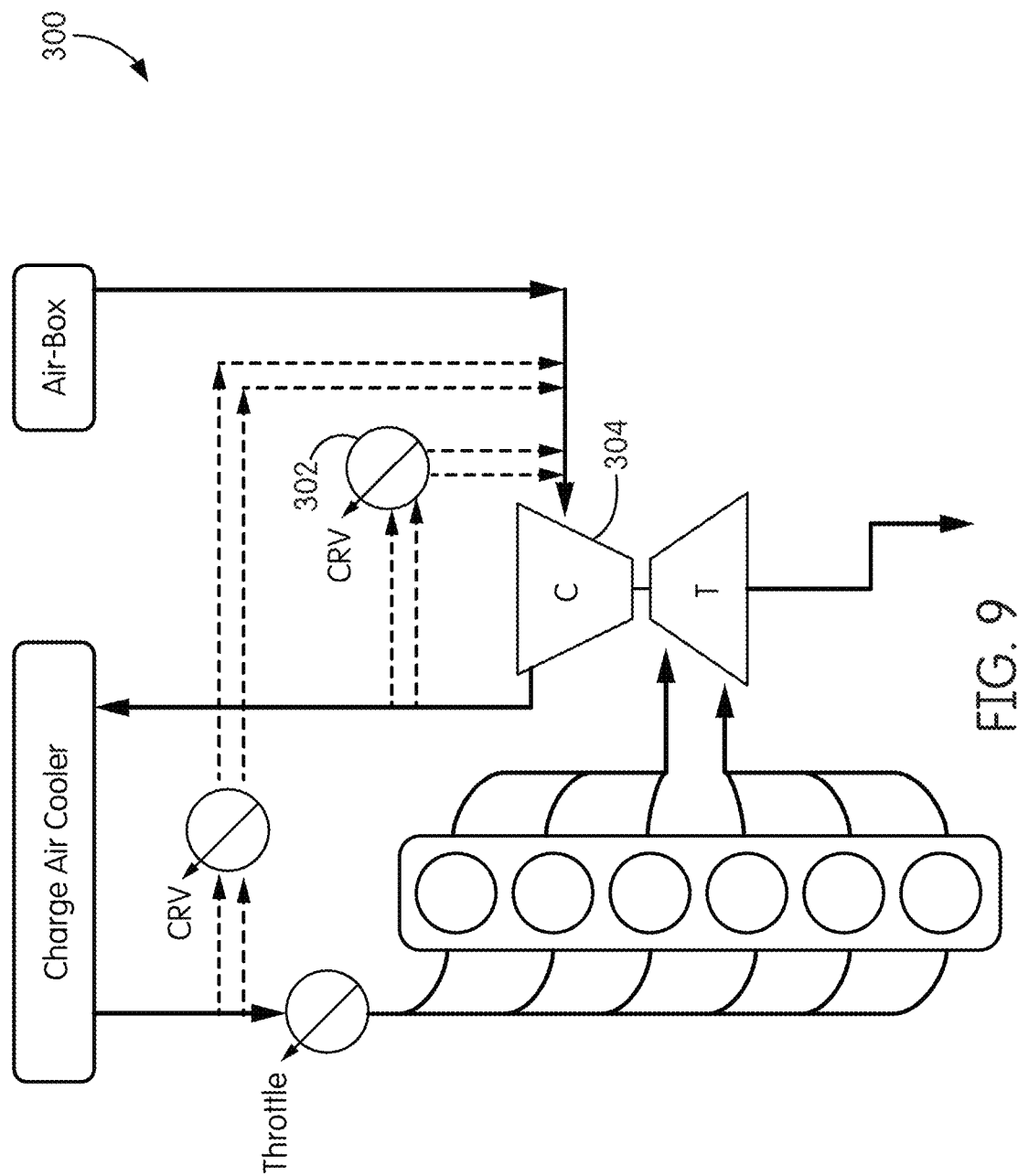
FIG. 9 is a schematic illustration of a compressor recirculation system.

In order to prevent this, an electronically controlled compressor recirculation valve (CRV) was implemented. FIG. 9 is a schematic illustration of a compressor recirculation system 300, according to an embodiment. The compressor recirculation system 300 includes a CRV 302 that is controllably actuated to prevent back flow of the intake air to a compressor 304. The CRV 302 is structured to be controllably opened to provide a path to bleed off the high pressure air to prevent compressor surge, particularly during tip-out events or at any suitable time to help prevent surge. The CRV 302 is controlled based on various parameters, such as air pressure, compressor operating parameters, engine operating parameters, etc.

Engine Optimization

A stoichiometric with cooled EGR combustion system was coupled to the engine 202 as it has the capability to deliver high BMEP, extremely low emissions and robust operation. The performance optimization and development of the engine 202 subsystems was split into three critical areas: combustion system, fuel system, and charging system.

Combustion System

Development of the combustion system was focused on improvements in closed cycle efficiency, reduced heat transfer and capability of short burn durations under highly dilute conditions and short ignition delay times. High dilution was chosen in order to control component temperatures and to realize closed cycle efficiency improvements through reduced heat transfer as shown in FIG. 10.

Initial combustion system work was done using a full combustion cycle analysis on a calibrated combustion CFD model. A baseline combustion system delivered 10% to 90% burn durations capable of tolerating high levels of EGR dilution. The system 200 was structured to maintain that burn duration with improved efficiency and ignition delay. FIG. 10 is a plot of impact of EGR on gross indicated efficiency of the engine. FIG. 11A is a plot of burn duration and FIG. 11B is a plot of ignition delay vs. crank angle of 50% (CA50) variations.

Figure 10:
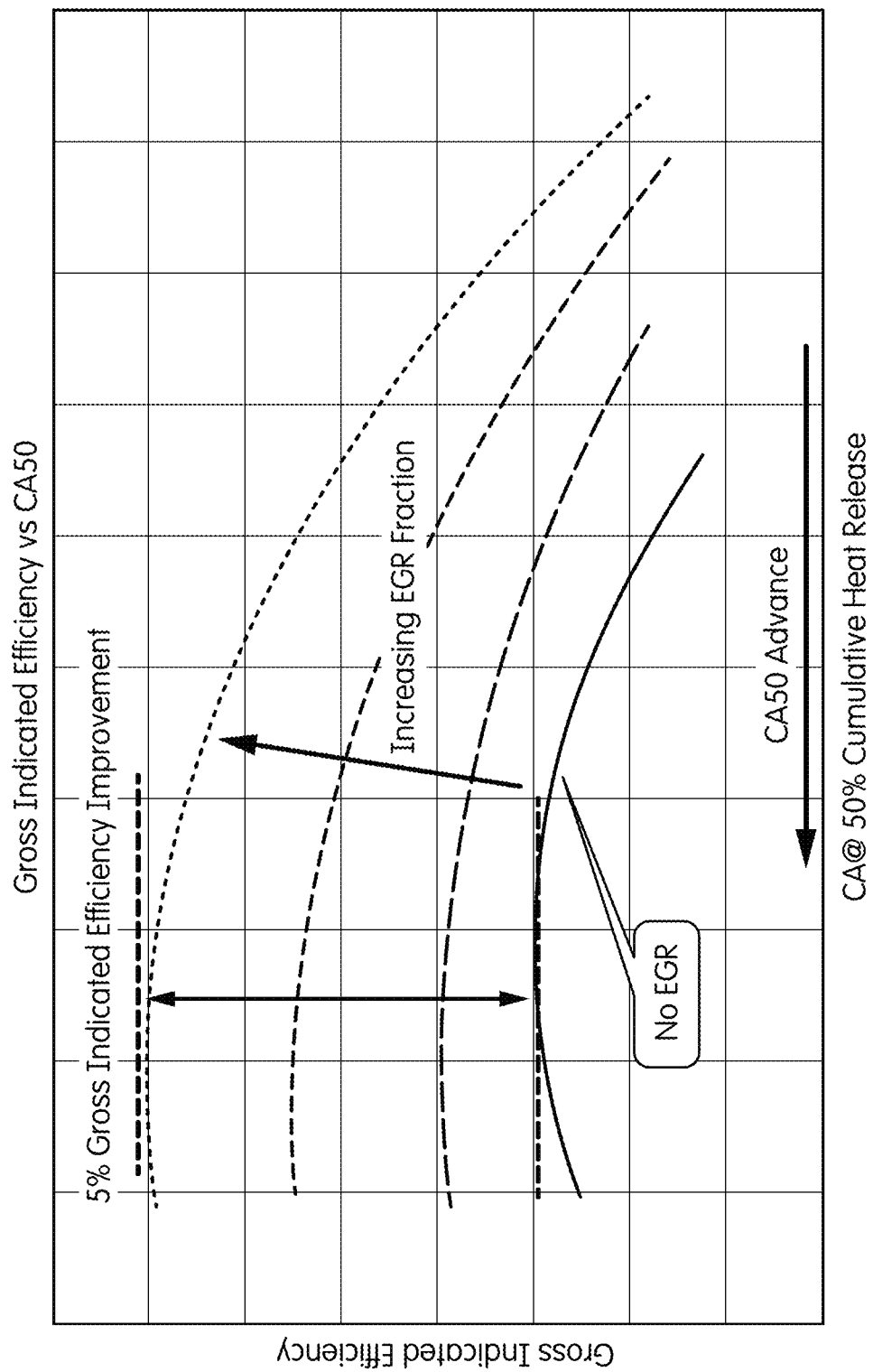
FIG. 10 is a plot of impact of EGR on gross indicated efficiency of the engine.
Figure 11B:
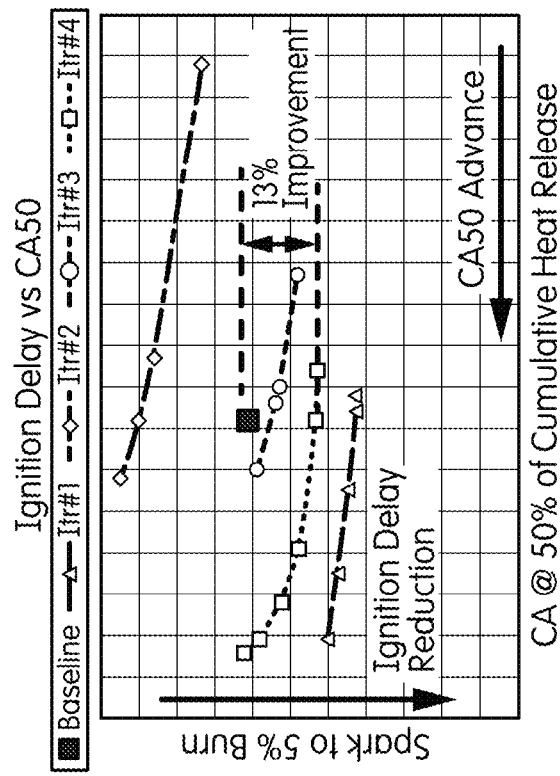
FIG. 11A is a plot of burn duration and FIG. 11B is a plot of ignition delay vs. crank angle of 50% (CA50) variations.
Figure 11A:
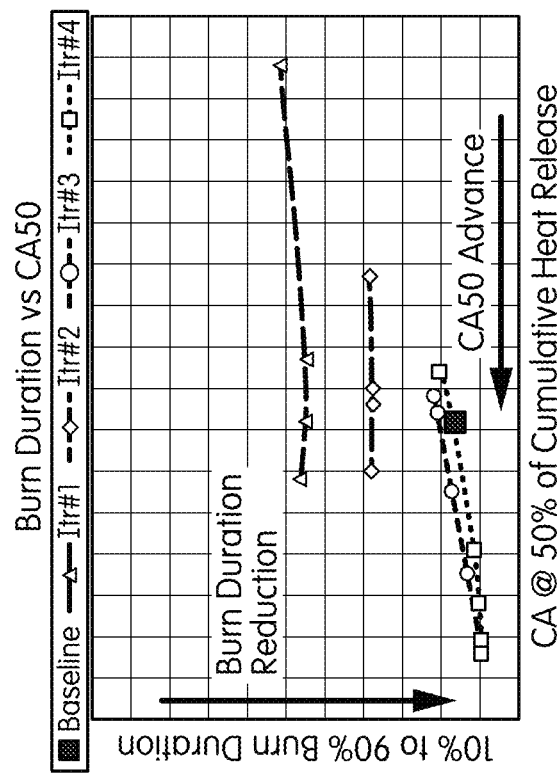
Figure 12:
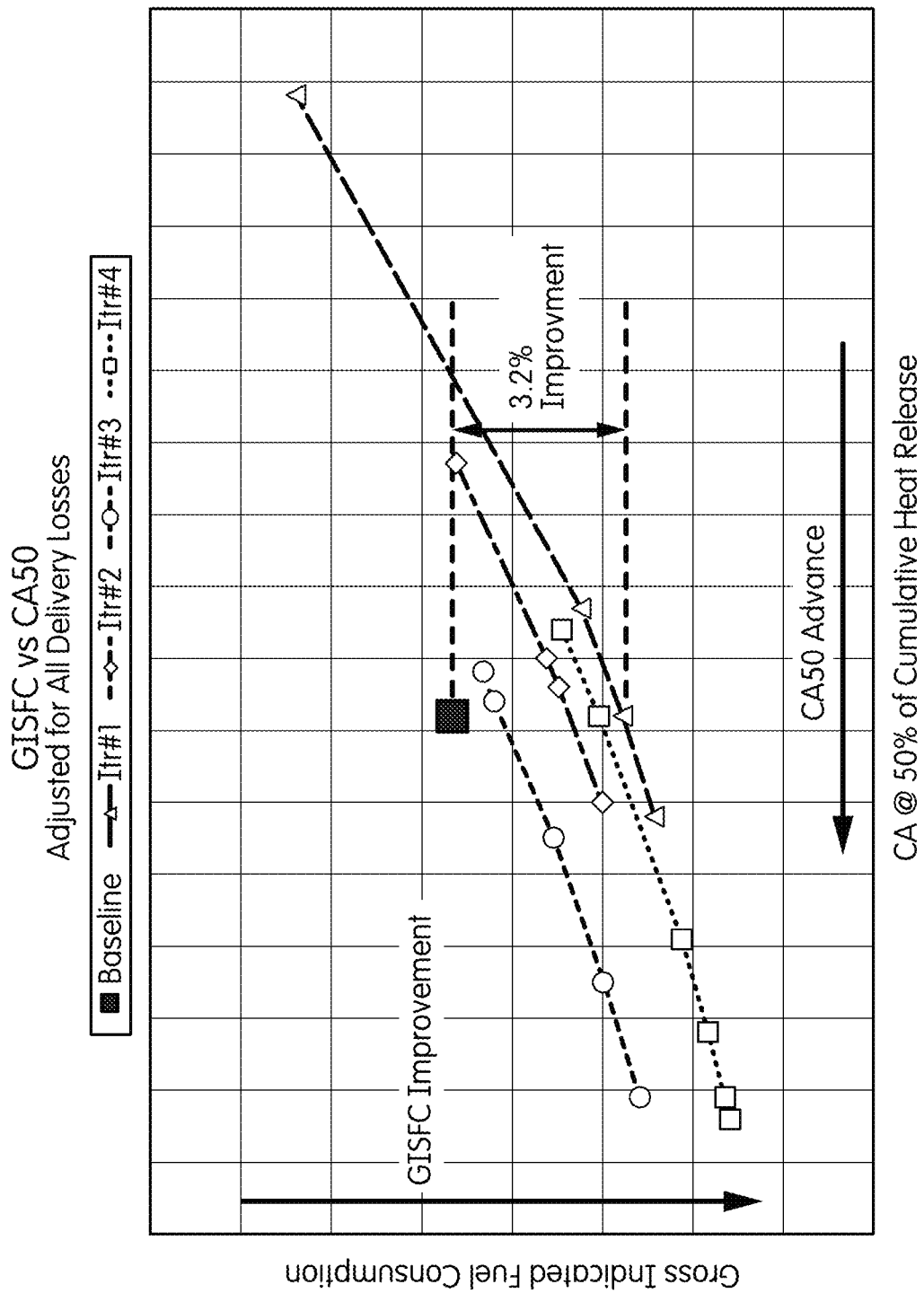
FIG. 12 is a plot of indicated fuel consumption of the engine.

The progression from iteration #1 to iteration #4 as shown in FIG. 10 represents the investigation of swirl level along with charge motion development during the cycle and the impact to combustion. Iteration #1 represents the best efficiency that was achieved because charging penalties were minimized representing the entitlement for efficiency. Iteration #2-#4 represent iterations to improve the burn duration with minimal impact to efficiency by influencing the in cylinder charge motion. Trends in burn duration and ignition delay are shown in FIGS. 11A-B. Iteration #4 was chosen as the combustion system for this engine as it was the best tradeoff for key deliverables. Fuel consumption trends are shown in FIG. 12 for constant EGR levels.

Fuel System

Figure 13:
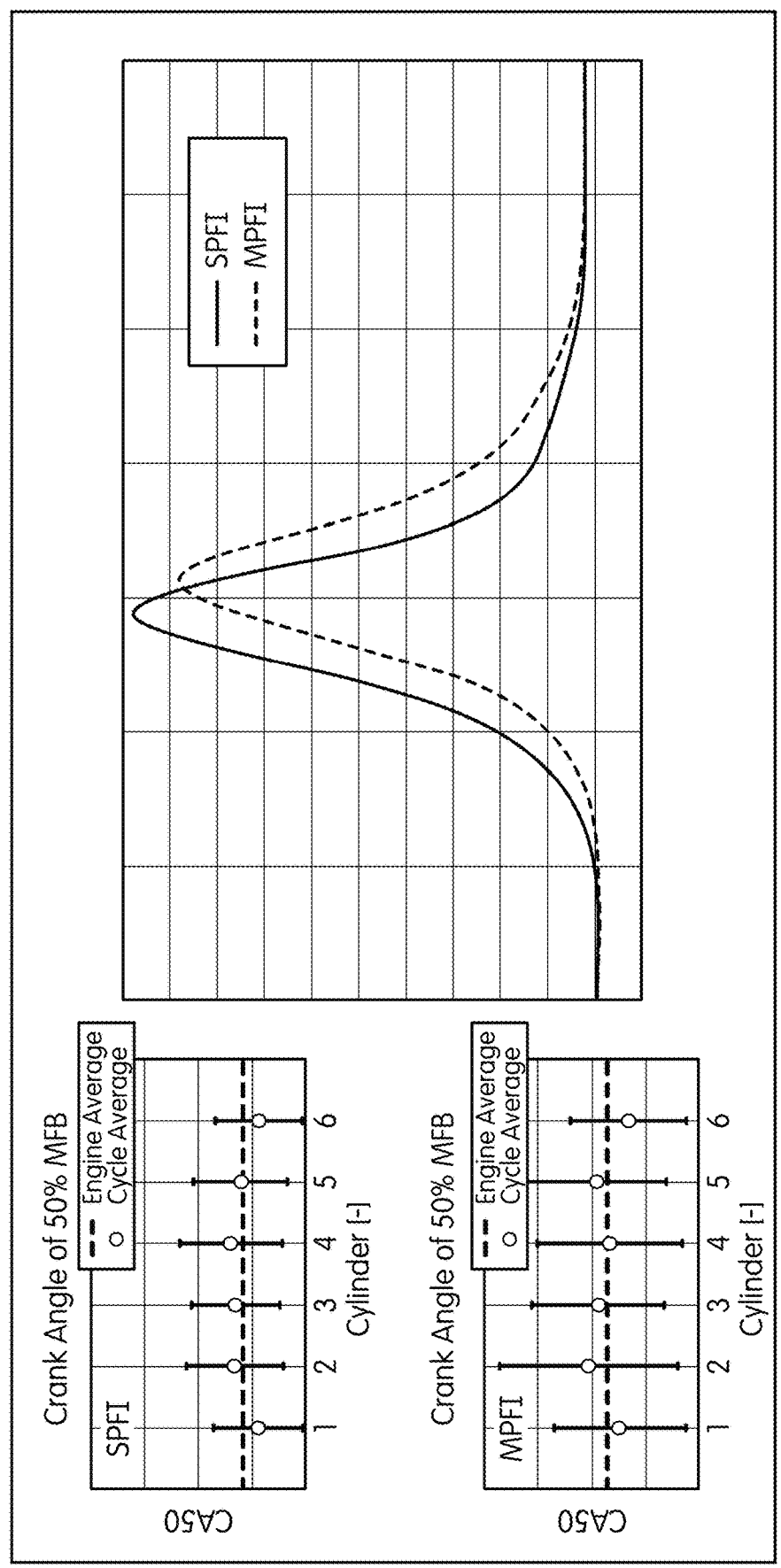
FIG. 13 is a plot of premix air/fuel mixture injection and port fuel injection (PFI) in each cylinder of the engine of FIG. 3.

The benefit of a premix combustion system may comprise homogeneity of the fuel and air mixture. The disadvantages may comprise transport delays, catalyst dither amplitude attenuation, and mitigation techniques in the event of cylinder misfire. Challenges of port fuel injection are mixture stratification, number of physical parts and injection pressure requirements. The benefits to MPFI may comprise cost, fuel control cylinder by cylinder, transient response time and three-way catalyst (TWC) control. FIG. 13 are plots of premix air/fuel mixture injection and port fuel injection (PFI) in each cylinder of the engine of FIG. 3. Degraded combustion due to PFI was observed as shown in FIG. 13.

Figure 14:
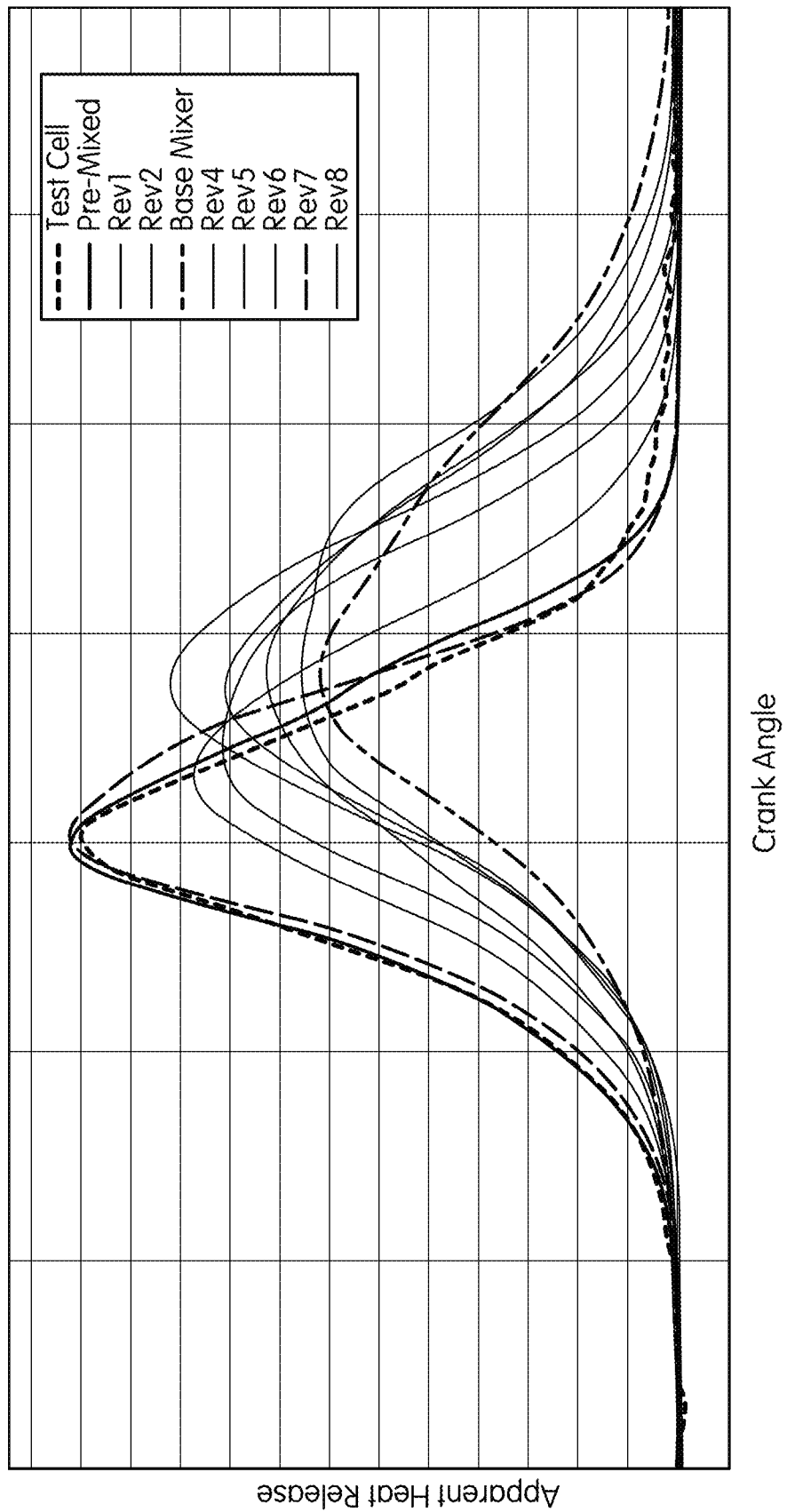
FIG. 14 is a plot of apparent heat release vs. crank angle of a crank shaft of the engine of FIG. 3 operated using PFI.

Further work was done to understand if MPFI stratification could be improved to match performance of the premixed combustion. FIG. 14 is a plot of apparent heat release vs. crank angle of a crank shaft of the engine of FIG. 3 operated using PFI. Many iterations of mixing devices as well as injection strategies were assessed via combustion CFD in order to compare combustion performance as shown in FIG. 14. The MPFI mixing observations yielded a design and injection strategy that was transparent to the premix injection strategy allowing for advantages of PFI to be realized.

Charging System

Figure 15:
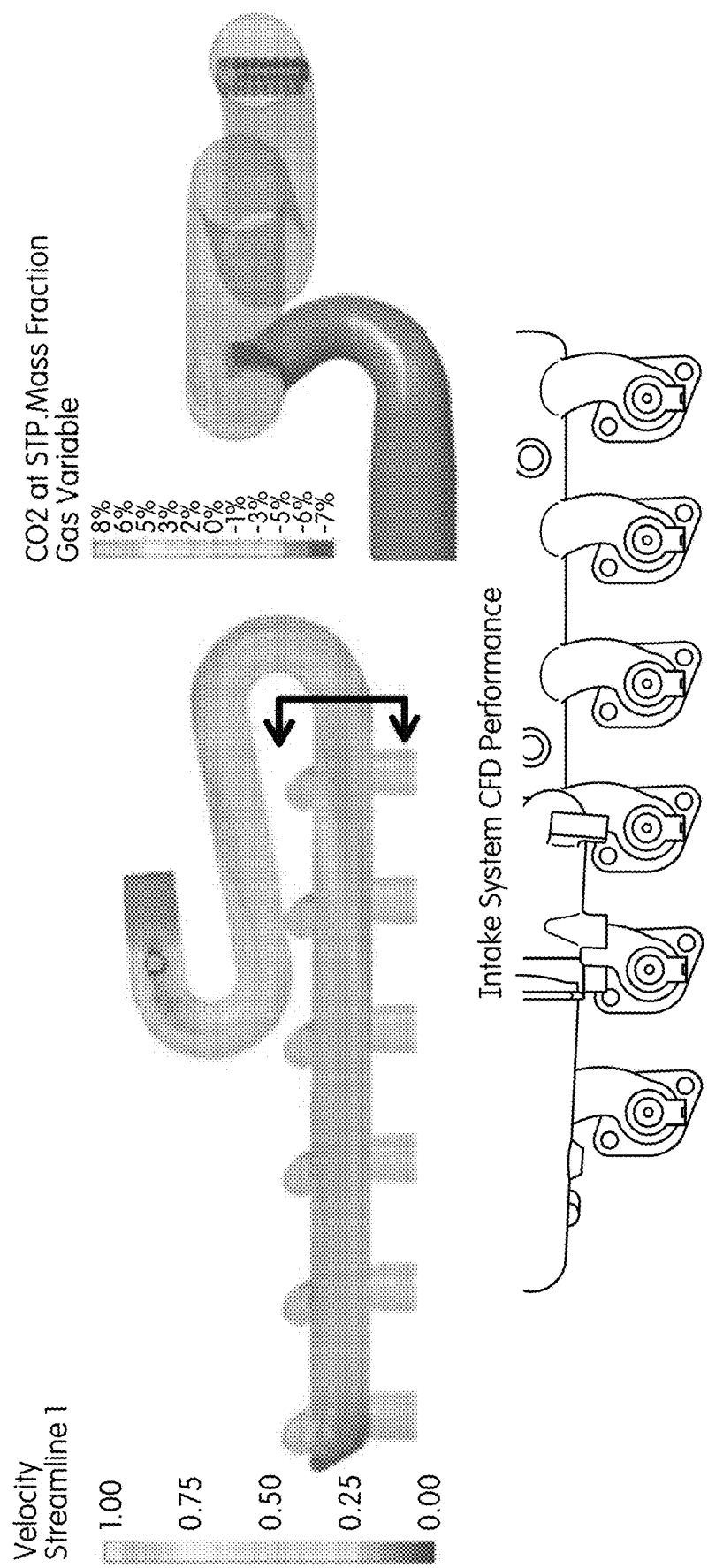
FIG. 15 is a computational fluid dynamic (CFD) model showing modeled performance of the intake system included in the system of FIG. 3.

The charging system was structured to provide a uniform and equal mixture of air and EGR to each cylinder of the engine 202. In addition, the charging system was designed such that it could minimize the trapped residuals. Additionally the turbine 260 was sized such that it could accommodate the lower flow rates of a stoichiometric engine 202 with EGR 270 and provide the necessary pressure balance to drive the desired EGR levels. The intake system was assessed for charge delivery and mixture uniformity. With stringent requirements for charge uniformity and charge distribution a final intake configuration as shown in the CFD model of FIG. 15 was chosen.

Figure 16:
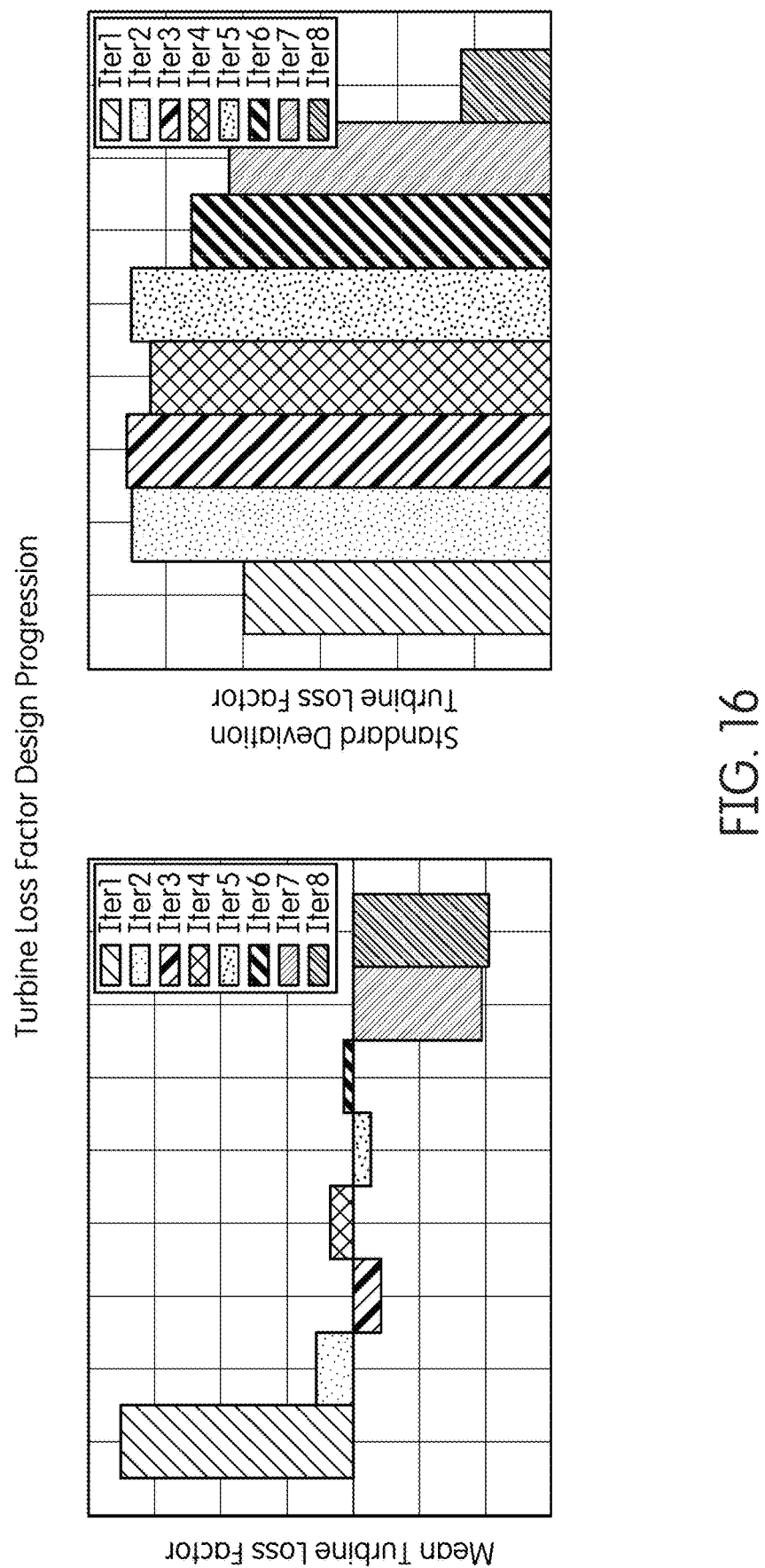
FIG. 16 are bar charts summarizing turbine loss factors.

The exhaust system was extensively tested and developed in order to ensure good cylinder balance as well as facilitate an efficient exhaust event. FIG. 16 shows a summary of iterations assessed using a novel modeling approach in CFD to determine turbine loss factors. The iterations were focused on geometric changes that improved losses in the manifold and balanced the losses cylinder by cylinder. Iteration #8 was chosen as the exhaust manifold 210 configuration for the engine 202.

Controls

Air Handling Control

Figure 17:
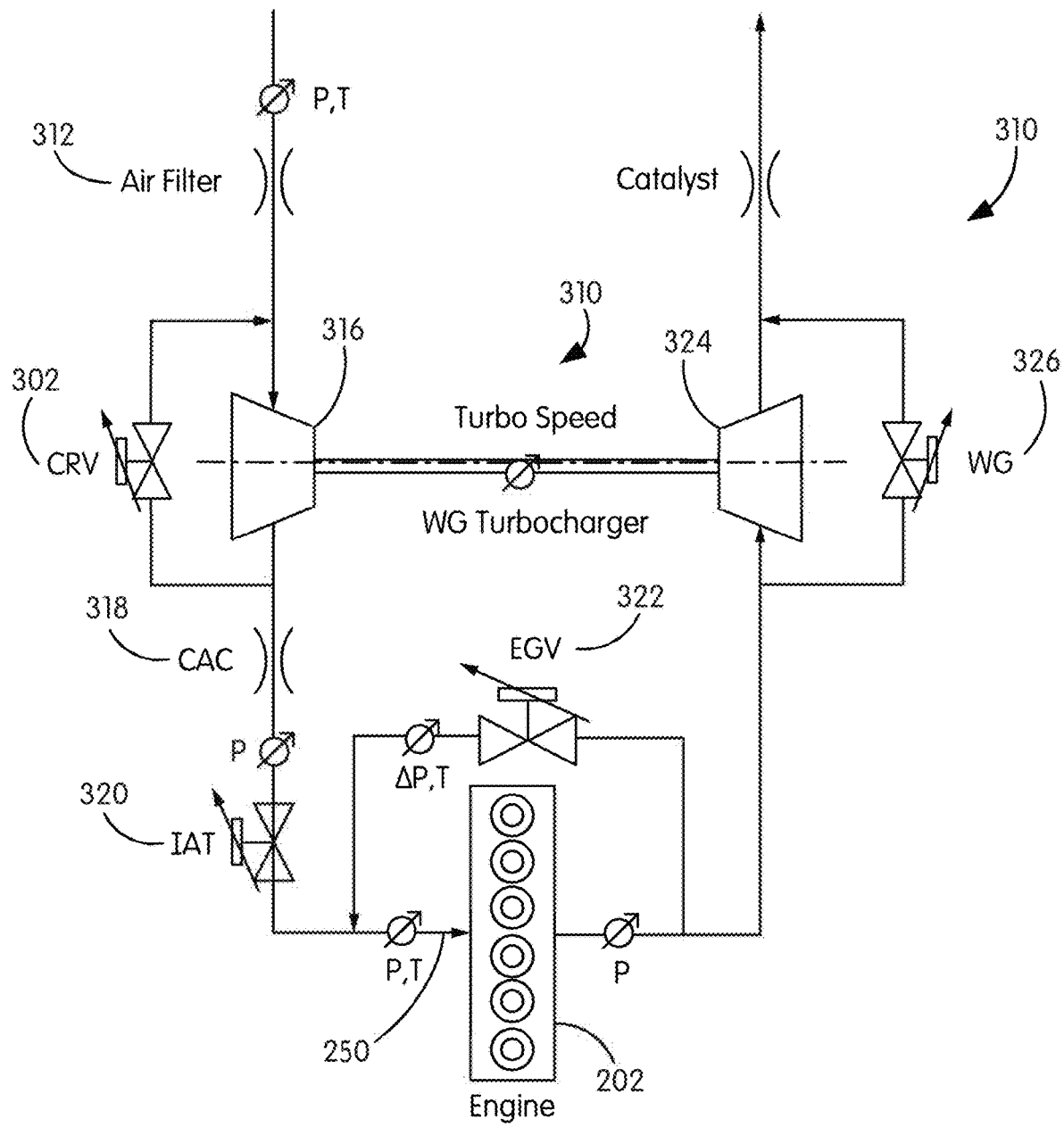
FIG. 17 is a schematic illustration of an air handling architecture.

FIG. 17 is a schematic diagram of an air handling (AH) system 310, according to an embodiment. The air handling system 310 includes the engine 202 FIG. 2 and the CRV 302 of FIG. 9. The fresh air coming from the atmosphere enters the system 310 through an air filter 312. Pressure is raised by a compressor 314 of a turbocharger 316 and temperature reduced by a charge air cooler (CAC) 318. This air reservoir together with an Intake Air Throttle (IAT) 320 is used to control the air flow going into the intake manifold 250. Similarly, the EGR flow diverted from the exhaust manifold 210 is controlled by an EGR Valve (EGV) 322. Both air and EGR are mixed in the intake manifold 250 at rates controlled by the valves. Lastly, the compressor 314 is maintained away from the surge region by actuating the CRV 302.

The exhaust gas not diverted to the intake manifold 250 is communicated to a waste-gated turbine 324 of the turbocharger 316 where a waste gate valve (WG) 326 is used to control what portion of the flow is bypassed. By doing so, the energy going to the turbine 324 and consequently the boost can be controlled within certain limits. The control comprises calculating the IAT 320, EGV 322, and WG 326 actuator commands to achieve the target engine Fresh Air Flow (FAF), EGR fraction and/or boost.

In stoichiometric engines, FAF is directly related to engine power so the target FAF is calculated from the driver torque request and engine speed. EGR fraction, on the other hand, is used to reduce knock and PMEP and $NO_x$. The EGR fraction target is usually calibrated as a function of (at least) load and engine 202 speed. Finally, having three actuators allows the tracking of three references (when feasible). The last target for the air handling control is turbocharger boost, which allows to trade off transient performance with pumping efficiency. A common target to exercise this tradeoff is the pressure drop on the IAT 320, which may be stored, for example as a function of engine 202 load and speed.

Figure 18B:
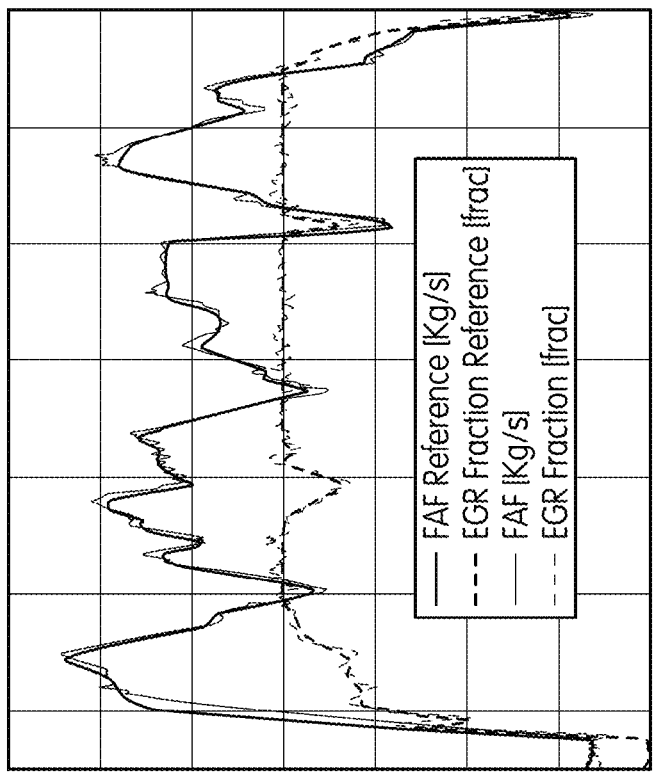
FIG. 18A is a plot of fresh air flow and FIG. 18B is a plot of EFR Fraction tracking during a federal testing procedure (FTP) cycle.
Figure 18A:
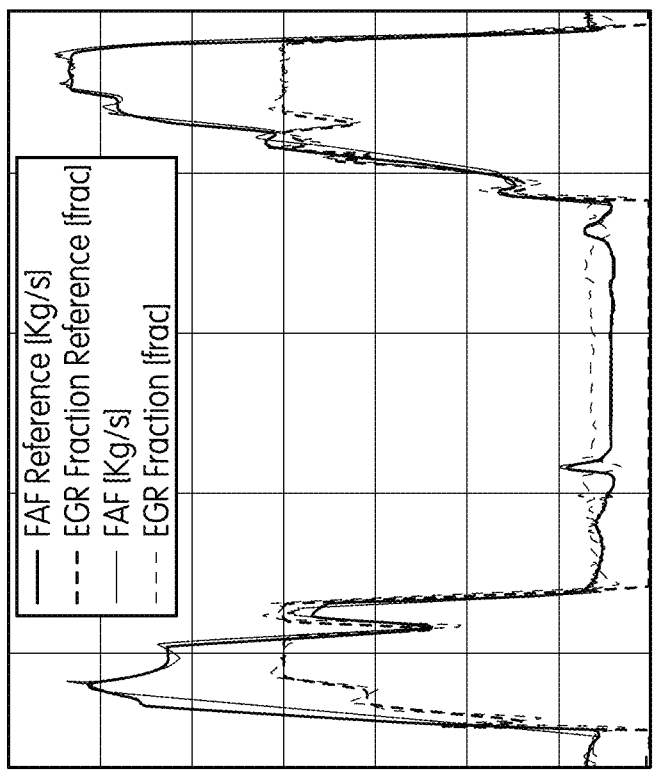

The control was designed using physical models of the AH components, which significantly reduced the need for empirical table lookups to address system nonlinearities and changes in environmental conditions. The FAF and EGR fraction control performance is shown in FIG. 18. FIG. 18A is a plot of fresh air flow and FIG. 18B is a plot of EFR Fraction tracking during a federal testing procedure (FTP) cycle. Overall, the FAF and EGR Fraction remain on top of the reference with few exceptions, most of them related to turbo spooling. The large EGR fraction deviation during idle regions corresponds to EGR flow measurement errors at low flows. The actual tracking error is zero since the EGR valve 322 remains close during those regions.

Air Fuel Ratio Control

Figure 19:
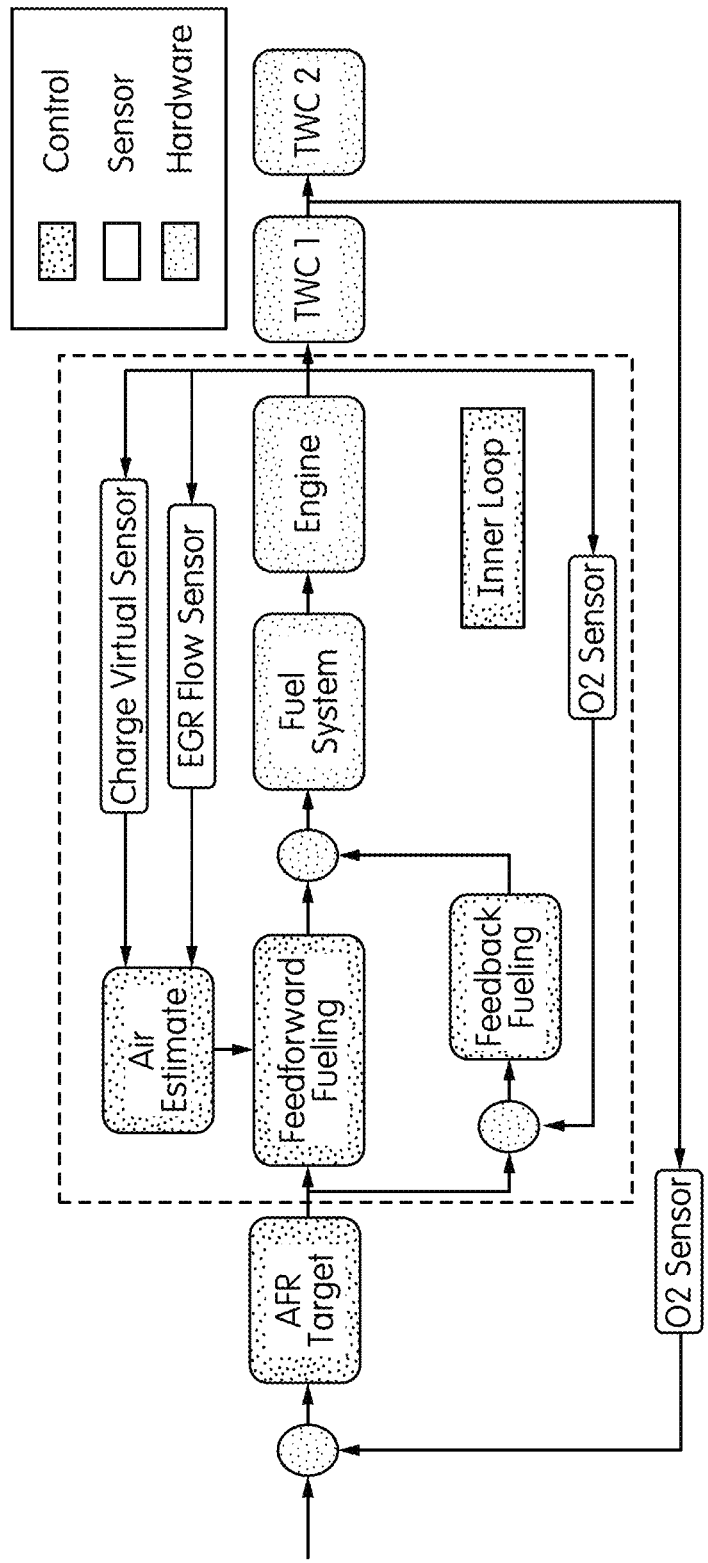
FIG. 19 is a schematic illustration of an air/fuel ratio control system.

The conversion efficiency of the TWC is directly related to the AFR. Therefore, AFR is a strong lever to control the system out emissions. FIG. 19 is a schematic illustration of an air/fuel ratio control system, according to an embodiment. The AFR control system comprises a cascade control system with two loops (inner loop and outer loop). The inner loop adjusts the on-time of the fuel injectors to precisely track the AFR target, while the outer loop determines the AFR target based on the catalyst states for best conversion efficiency of the emission constituents.

Figure 20B:
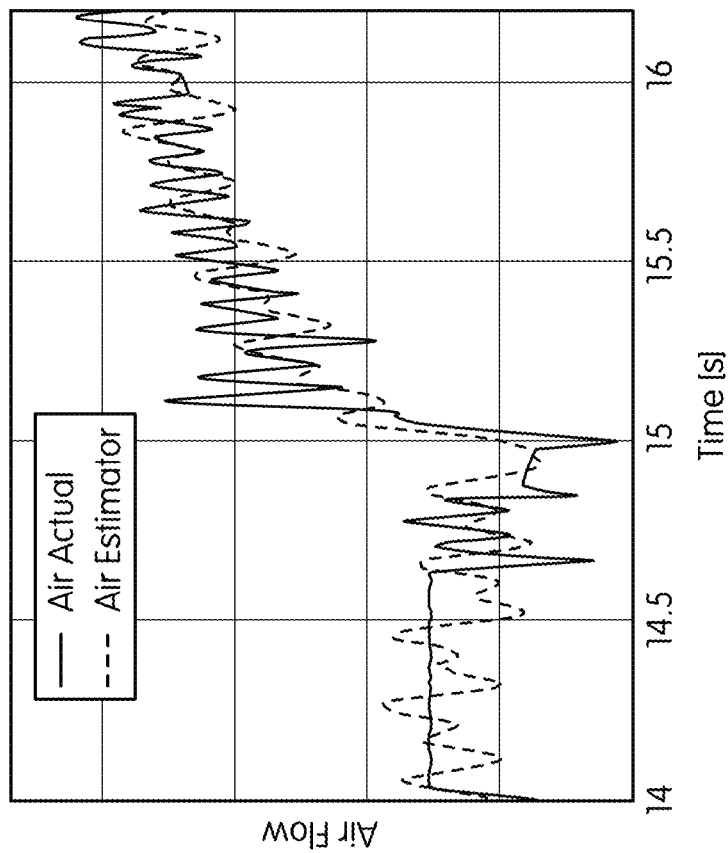
FIGS. 20A-B are plots of air estimator performance at speed A (FIG. 20A) and speed B (FIG. 20B).
Figure 20A:
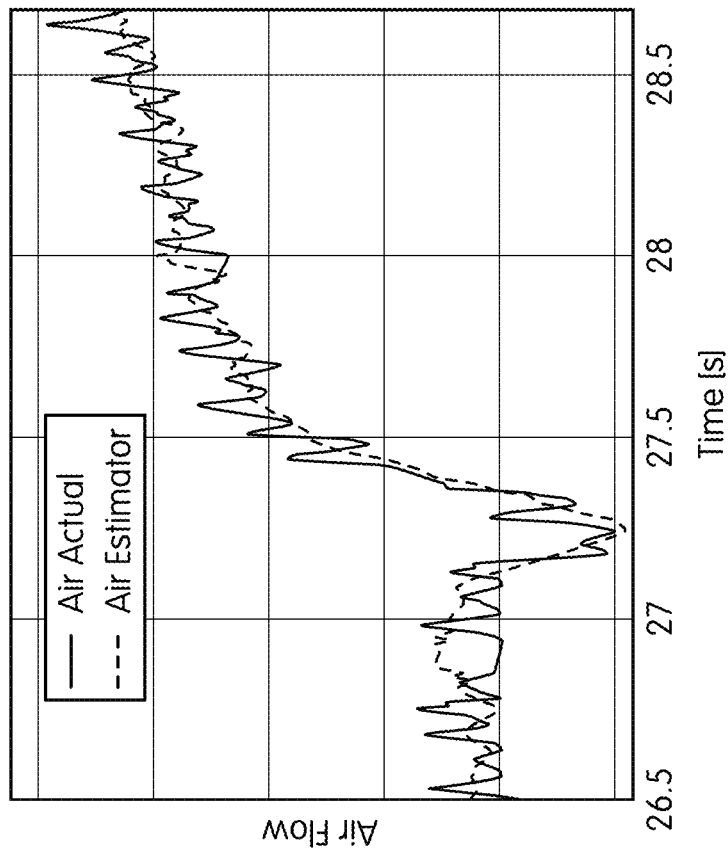
Figure 21A:
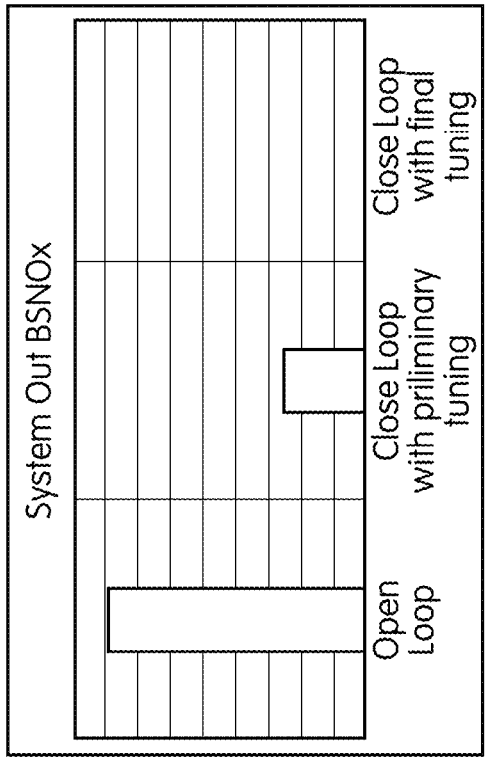
FIGS. 21A-D are plots demonstrating the influence of outer loop on constituents of an exhaust gas emitted from the system of FIG. 3.
Figure 21B:
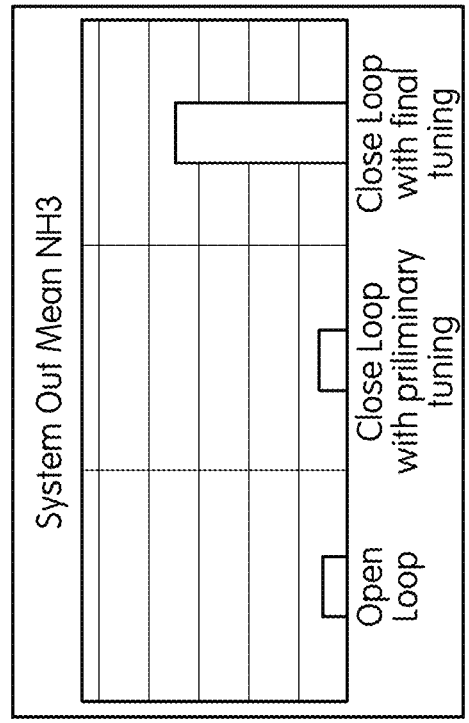
Figure 21C:
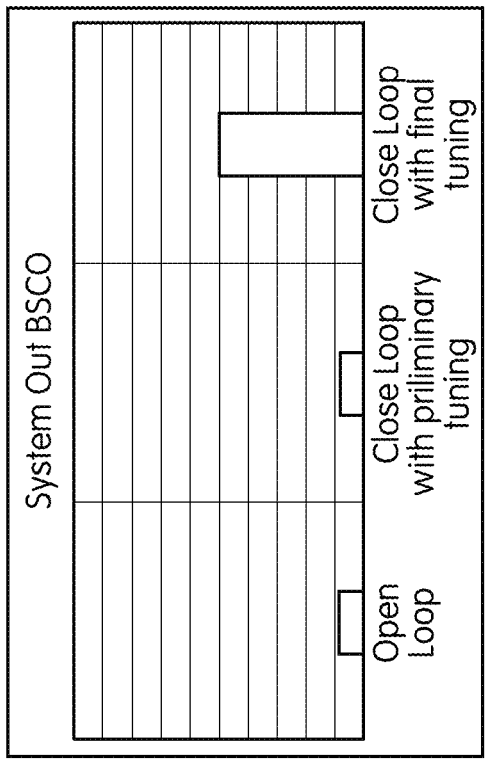
Figure 21D:
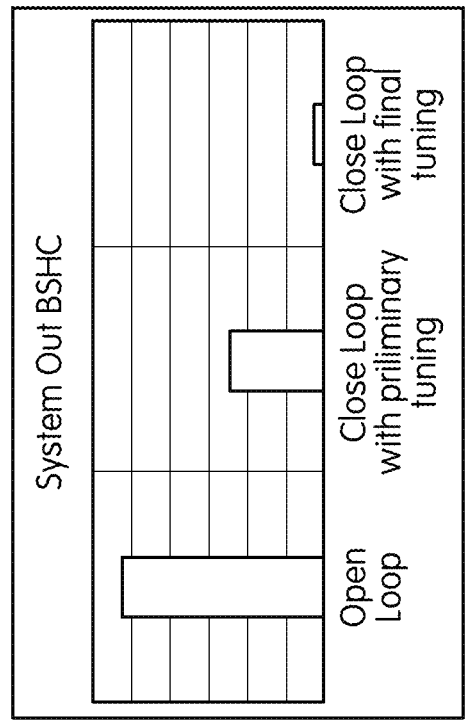

The inner loop consists of feedforward and feedback fuel scheduling. The feedforward fueling schedules fuel injector on-time based on the estimated air mass in the cylinder, while the feedback trims the feedforward calculation based on a wideband lambda sensor located after the turbocharger. Due to the slow response of the feedback loop, the transient performance of the AFR control is mainly determined by the feedforward fueling. The dynamics of the injectors can be neglected due to its fast response time compared to the air dynamics. Therefore, accuracy of the air estimator plays the most important role in defining the inner loop control performance. A physics-based approach, which utilizes a charge virtual sensor and an EGR flow sensor, was developed to accurately predict air flow to the cylinder. FIG. 20A-B shows the on-engine validation of the air estimator at different engine speeds.

The outer loop consists of a feedforward mean AFR target table. A feedback control trims the AFR target based on a wideband $O_2$ sensor located at midbed (between the first catalyst TWC1 and second catalyst TWC2). The feedforward mean lambda values are pre-determined via steady state catalyst characteristic testing at various engine 202 operating conditions. The objective is to maintain a constant AFR target at the midbed location that optimizes the conversion of all the emissions constituents. FIGS. 21A-D are plots demonstrating the influence of outer loop control on constituents of an exhaust gas emitted from the system 200 of FIG. 3. FIGS. 21A-D shows the influence of the outer loop control on the system out emissions. The benefit of having the outer loop control can be seen clearly from the individual plots. However, to meet the ultra-low $NO_x$ requirement, a trade-off among the emissions constituents may also be observed.

Aftertreatment

Various embodiments include a close-coupled after treatment architecture to meet system out ultralow $NO_x$ emission requirement. The after treatment architecture consists of both a close-coupled TWC and underfloor TWCs. This architecture provides a suitable compromise between high system efficiency and packaging constraints. The close coupled aftertreatment architecture demonstrates excellent performance in managing both cold-start and warm-start transient emissions control. Furthermore, through benchmarking evaluation, "TWC technology A" was selected to achieve both high $NO_x$ conversion and methane ($CH_4$) conversion at near stoichiometric lambda (i.e., air/fuel ratio). The platinum-group metal (PGM) loading of the after treatment system was engineered differently between the close-coupled and underfloor TWCs.

Figure 22B:
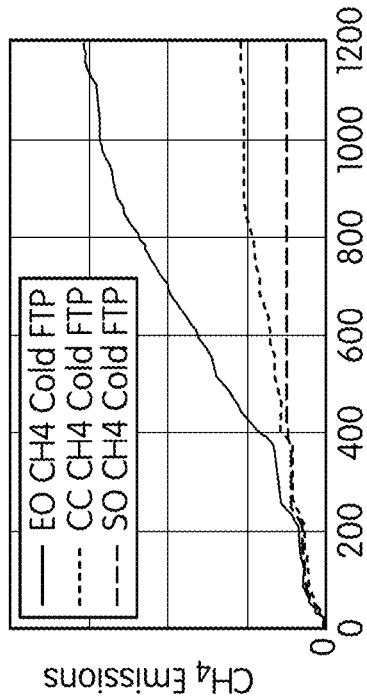
FIGS. 22A-C are plots of $NO_x$, (FIG. 22A), methane (FIG. 22B) and CO (FIG. 22C) emissions during heavy-duty cold FTP transient cycle. The emissions were report at engine out (EO), close-coupled catalyst out (CC) and system out (SO) locations.
Figure 22C:
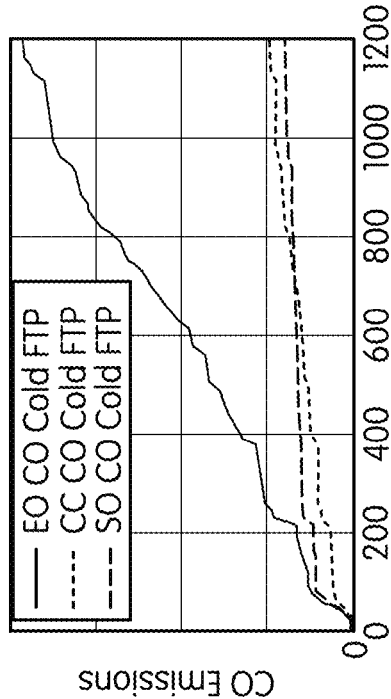
Figure 22A:
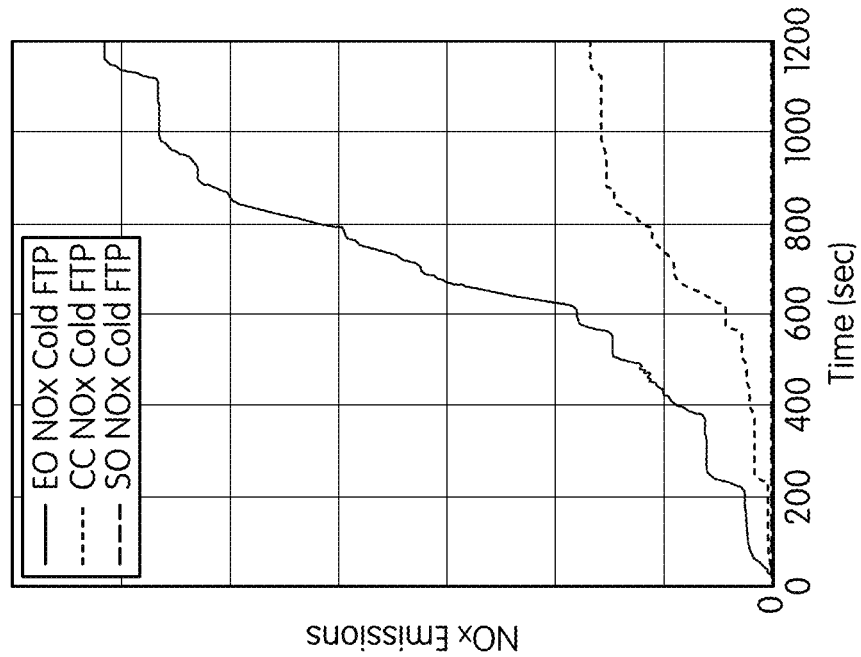

FIGS. 22A-C are plots of $NO_x$, (FIG. 22A), $CH_4$ (FIG. 22B) and CO (FIG. 22C) emissions during heavy-duty cold FTP transient cycle. The emissions were reported at engine out (EO), close-coupled catalyst out (CC) and system out (SO) locations. During the cold FTP transient cycle as shown in FIGS. 22A-C, the close-coupled TWC effectively managed the first 0-50 seconds $NO_x$ emissions control before warming up the underfloor catalyst. $CH_4$ emissions was largely controlled through close-coupled TWC for the first 380 seconds. The close-coupled TWC successfully converted over 70% of the cumulative engine out $NO_x$ emissions and over 60% of the cumulative engine out $CH_4$ emissions during the cold FTP cycle.

Figure 23B:
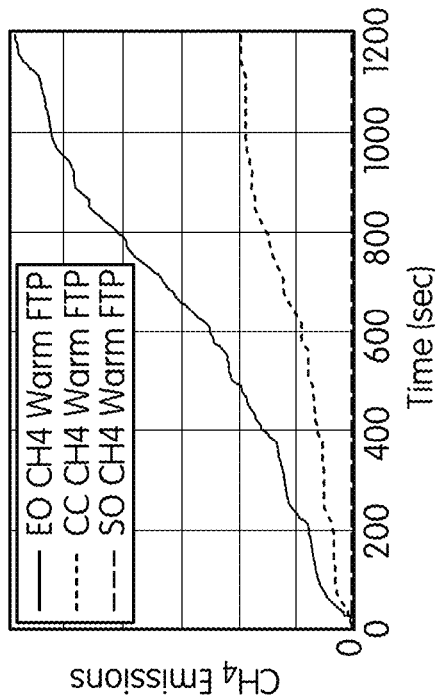
FIGS. 23A-C are plots of NOR, (FIG. 23A), methane (FIG. 23B) and CO (FIG. 23C) emissions during heavy-duty warm FTP transient cycle. The emissions were reported at engine out (EO), close-coupled catalyst out (CC) and system out (SO) locations.
Figure 23C:
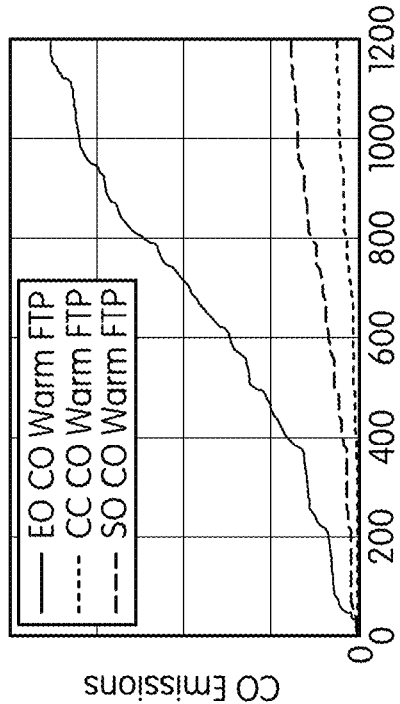
Figure 23A:
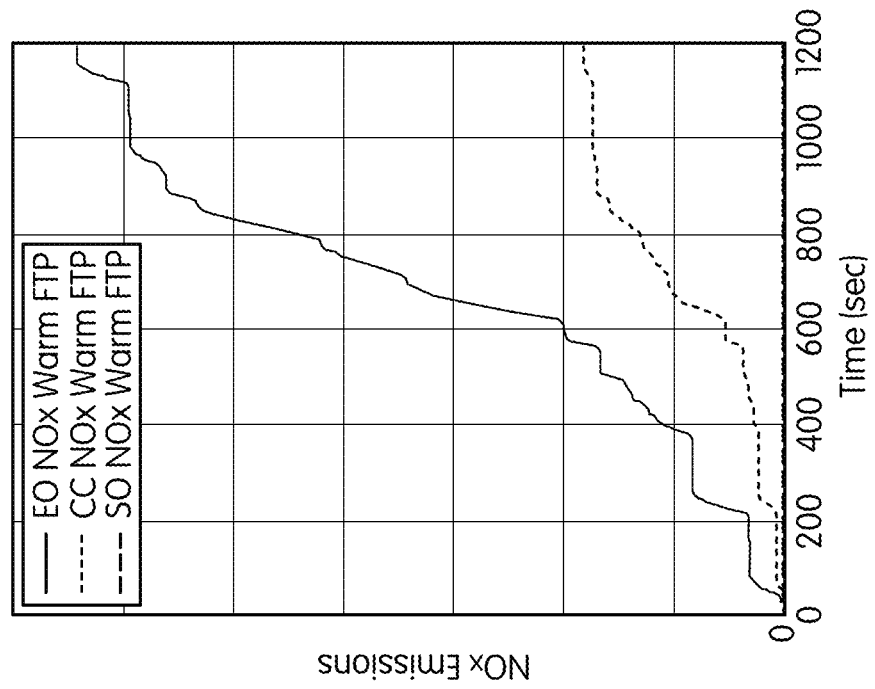

FIGS. 23A-C are plots of $NO_x$, (FIG. 23A), methane (FIG. 23B) and CO (FIG. 23C) emissions during heavy-duty warm FTP transient cycle. The emissions were reported at EO. CC and SO locations. During the warm FTP transient cycle as shown in FIGS. 23A-C, the close-coupled architecture converted over 70% of the cumulative engine out $NO_x$ emissions and over 65% of the cumulative engine out $CH_4$ emissions during the warm FTP cycle.

Various embodiments include a TWC model that is capable of closely predicting the application cycles emissions for natural gas application. Key challenges of developing such a model include dynamic oxygen storage mechanism, complex $CH_4$ oxidation and reforming kinetics and its interaction with the oxygen storage dynamics, and the highly transient nature of the air-fuel ratio control during the TWC application. The accuracy of such a TWC model may also depend on obtaining the right kinetic mechanisms through well-designed tests and reliable data collection.

Figure 24A:
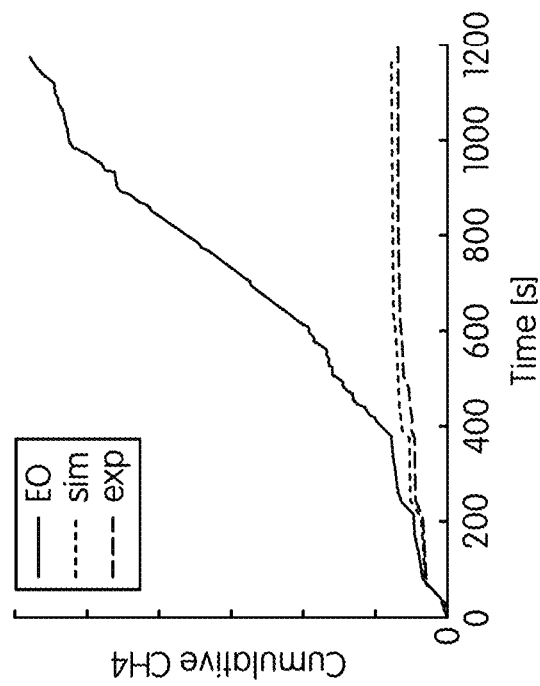
FIG. 24A is a plot of cumulative $NO_x$ and FIG. 24B is a plot of cumulative methane ($CH_4$) cold FTP transient cycle conversion performance predictions against testing data.
Figure 24B:
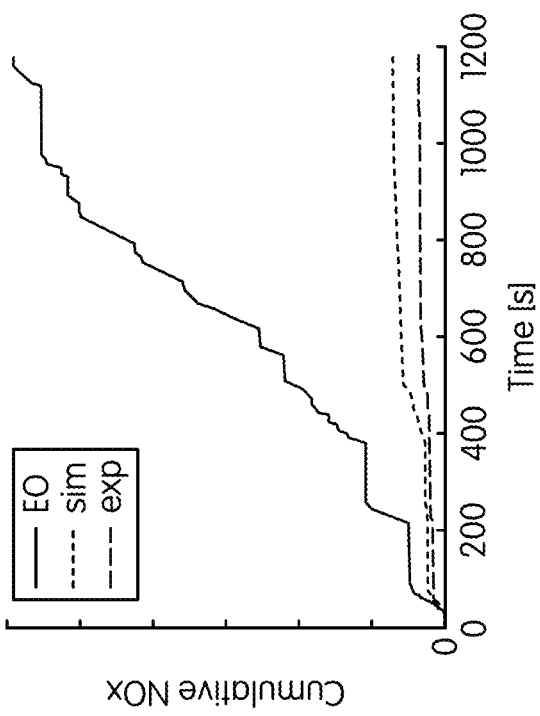

A global-kinetic TWC model was developed and validated using a production natural gas engine with an underfloor only after treatment system during transient emissions cycles (e.g. cold Federal Test Procedure cycle, warm Federal Test Procedure cycles and World Harmonized Transient Cycles). FIG. 24A is a plot of cumulative $NO_x$ and FIG. 24B is a plot of cumulative $CH_4$ cold FTP transient cycle conversion performance predictions against testing data. As shown in FIGS. 24A-B, the model has a high predictability of aftertreatment $CH_4$ and $NO_x$ performance during the cold FTP cycle against engine bench testing results.

System Integration

Figure 25:
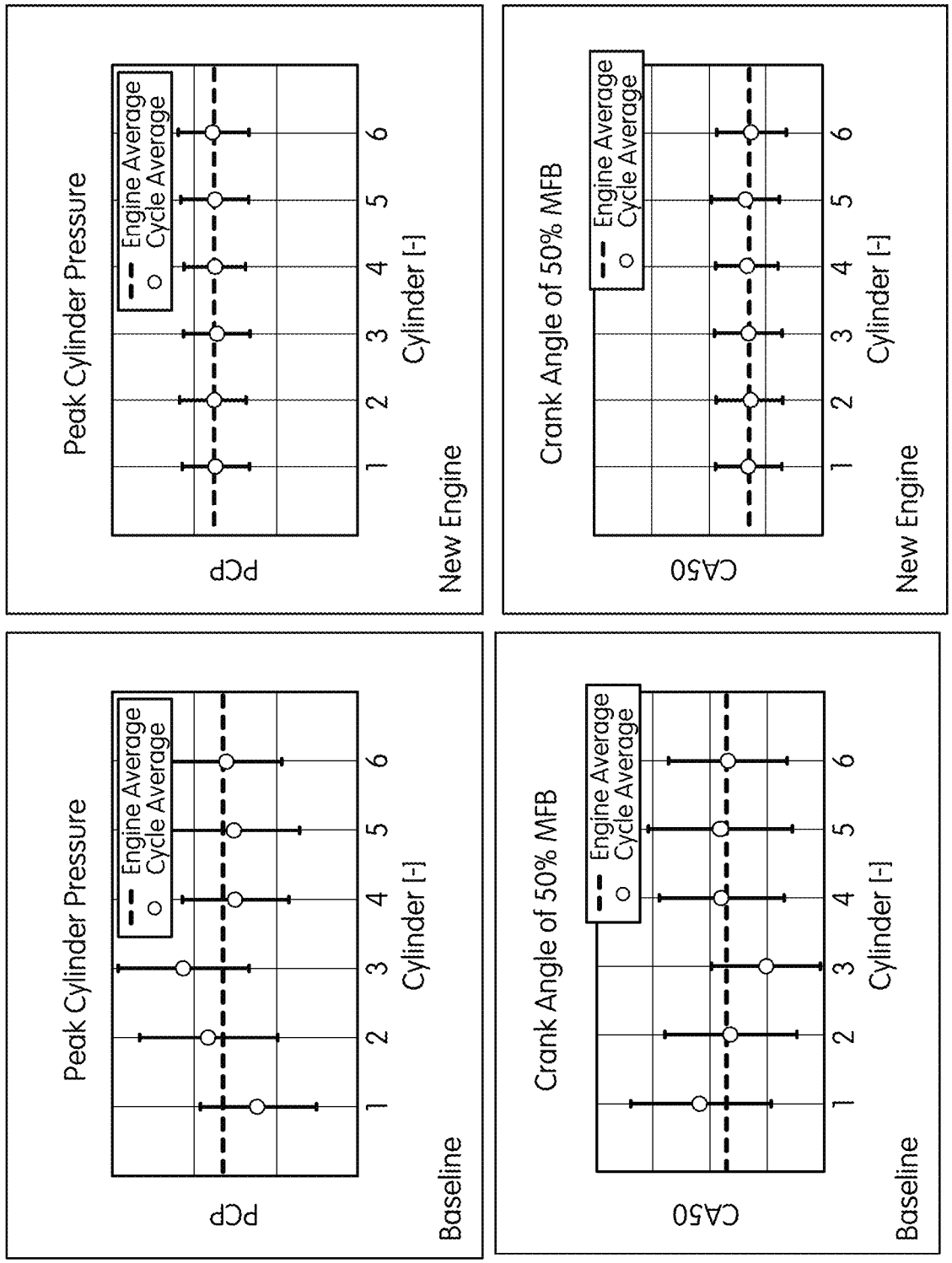
FIG. 25 includes plots of a peak cylinder pressure (PCP) and CA50 variations of a baseline and a new engine.

A system approach was used to develop a system that was capable of 90% reduction in $NO_x$ below current standards and has equivalent efficiency to a diesel engine. With the intake manifold 250, EGR assembly 270, exhaust manifold 210 and combustion systems as described herein, the robustness of the engine 202 was dramatically improved. Robustness of the engine 202 is depicted in FIG. 25 which includes plots of a peak cylinder pressure (PCP) and CA50 variations of a baseline and the engine 202 (also referred to as "the new engine") and show improvements in cylinder to cylinder and cycle to cycle variation at peak torque with three sigma error bars for reference. The reduction in variation across the engine 202 allows for better control of the engine 202, enables lower emissions capability, improved robustness/operating range, higher engine efficiency and capability for increased power density.

Figure 26B:
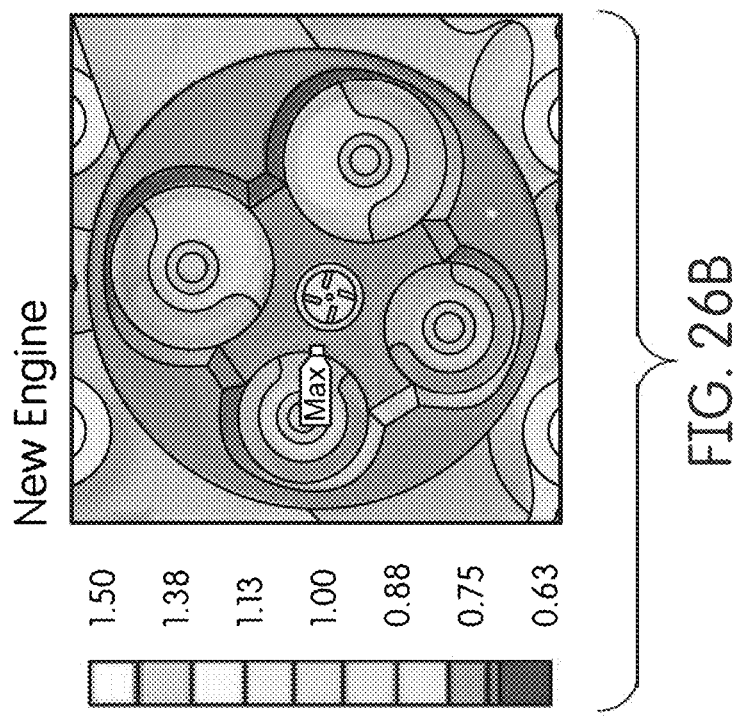
FIGS. 26A-B are FEA models comparing a combustion face temperature of the baseline engine (FIG. 26A) and a new engine (FIG. 26B).
Figure 26A:
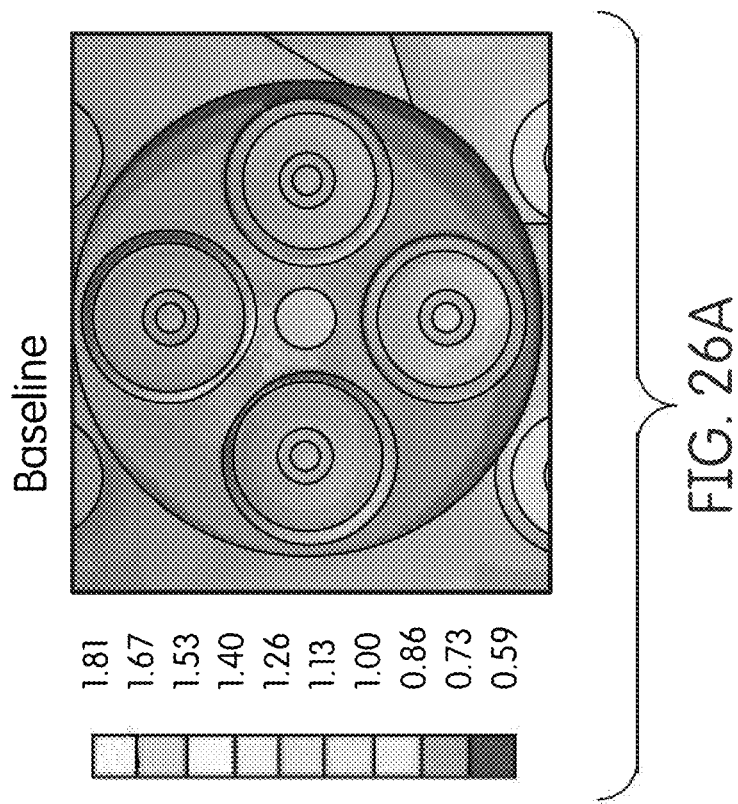

In addition to variation reduction, component durability was also addressed. An important component involved in engine durability is the cylinder head. A comparison of the head temperatures is shown in FIGS. 26A-B which are FEA models comparing a combustion face temperature of the baseline engine (FIG. 26A) and the new engine (FIG. 26B). The head temperatures were improved through a revised design so as to reduce the maximum temperatures as well as provide uniform cooling of the combustion face. A comparison of the baseline and the new engine are shown below.

Figure 27:
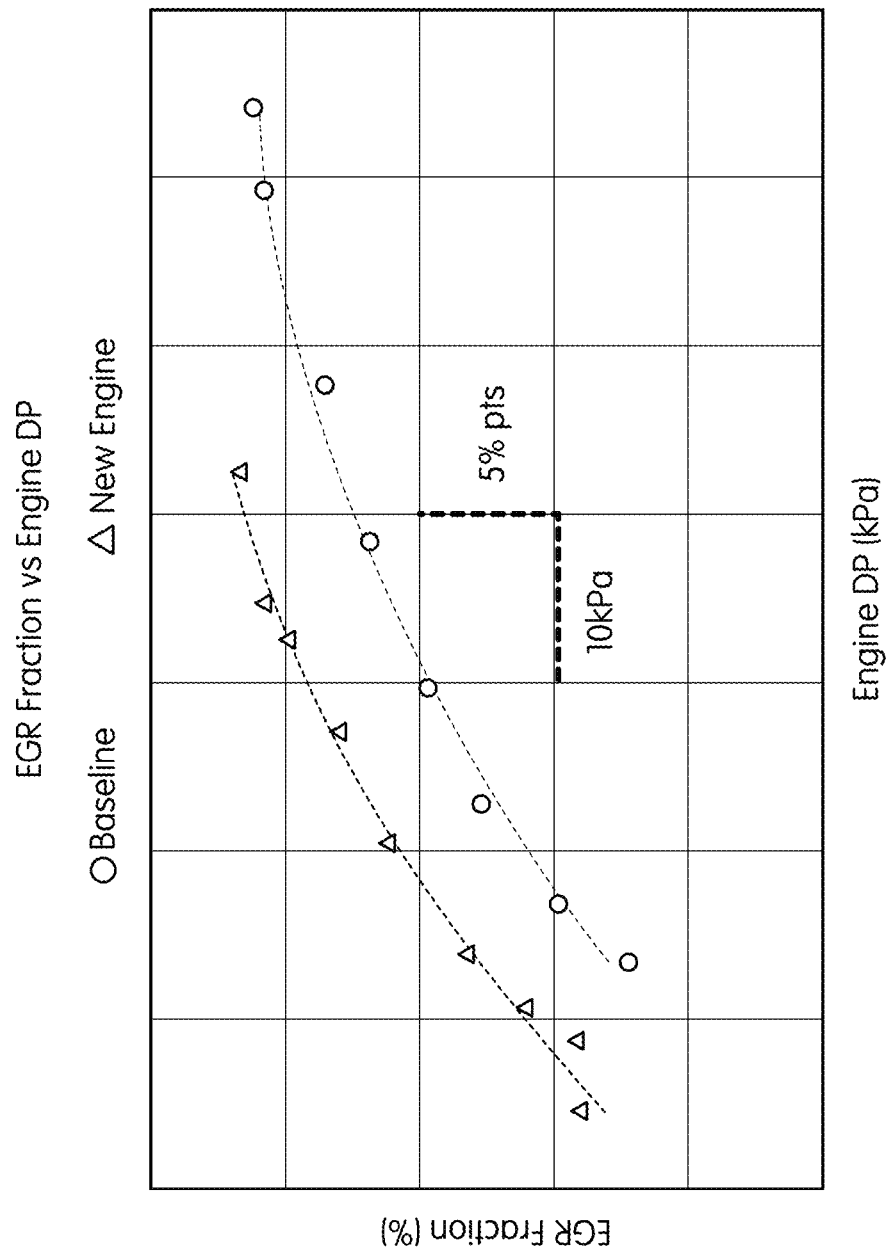
FIG. 27 is a plot of EGR fraction vs. engine pressure change or delta pressure (DP).

In addition to the cylinder head the exhaust system utilized improved high temperature materials for durability as well as revised designs to improve the loss coefficient of the manifold and improve the relationship between EGR fraction and engine delta p as shown in FIG. 27.

Figure 28:
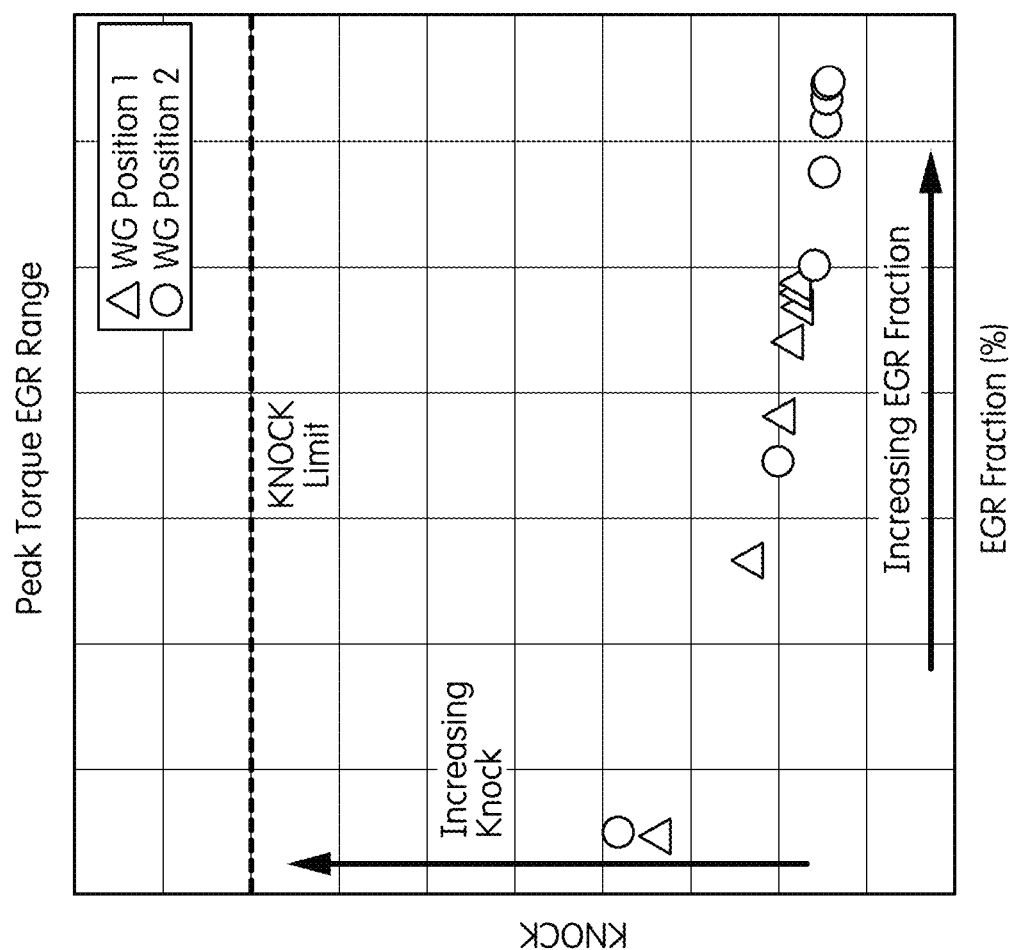
FIG. 28 is a plot of knock vs. EGR fraction.

The ability to drive large amounts of EGR with low engine delta p may allow for reduced residuals supporting a wide operating range for EGR at high load conditions which provides further robustness to knock. An example of the EGR Range at high load is shown in FIG. 28 for the peak torque condition.

Figure 29:
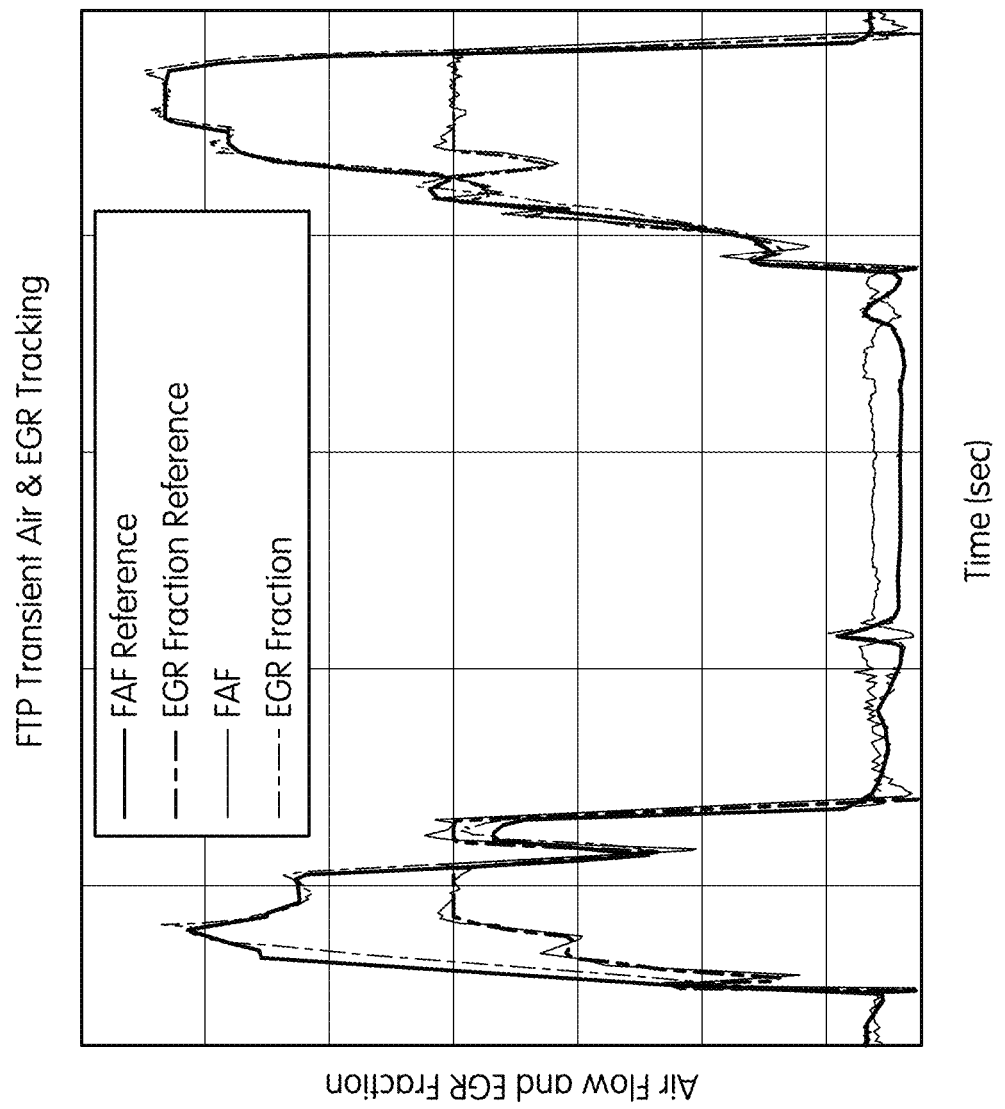
FIG. 29 is a plot of air flow and EGR fraction vs time.

With a significantly improved engine design, controls were redesigned as well to enable improved air handling, combustion and air/fuel ratio controls. The control system is capable of delivering the transient response, robustness and efficiency while at the same time delivering tight control for $NO_x$ emissions reduction. The tracking performance of the air handling system is shown in FIG. 29.

Figure 30:
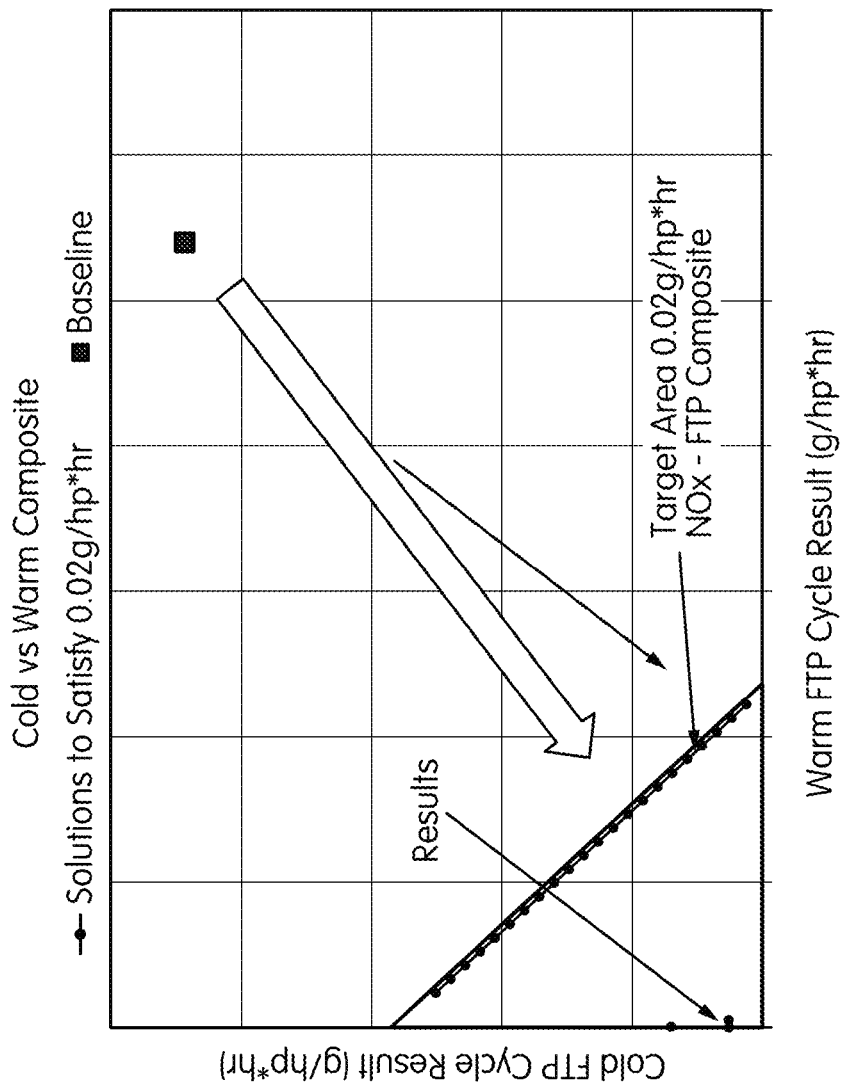
FIG. 30 is a plot of emission results for cold/hot FTP emissions test.
Figure 31:
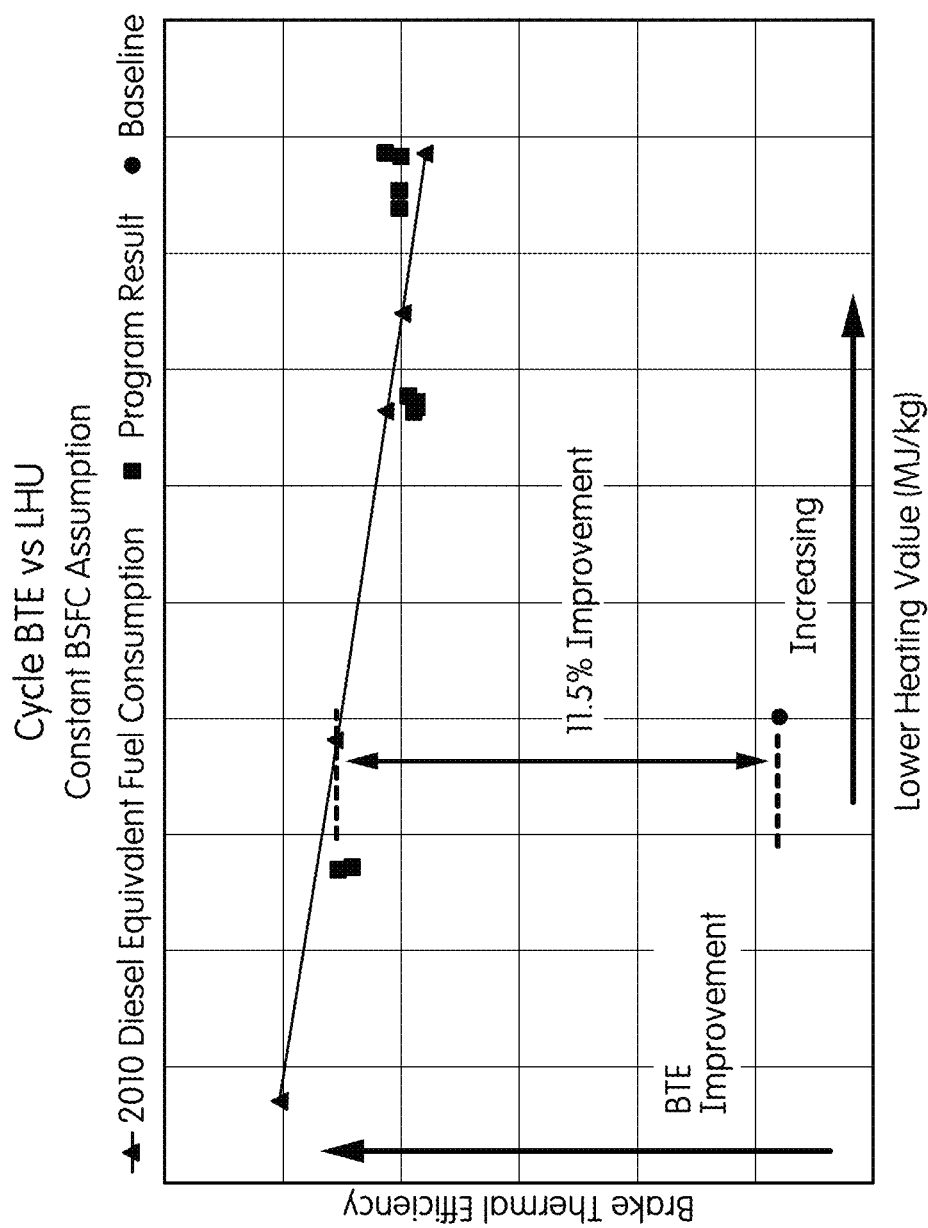
FIG. 31 is a plot of cycle brake thermal efficiency (BTE) vs. lower heating value.

Using the system described herein 90% reduction $NO_x$ emissions below current standards was achieved. The emission results are shown in FIG. 30. A cold/hot FTP emissions test was utilized to demonstrate compliance with the objectives of 0.02 g/hp-hr, according to various embodiments. In addition to the reduced $NO_x$ emissions the fuel economy was significantly improved over the baseline engine satisfying another target to demonstrate equivalent fuel consumption to a diesel engine. Results are shown in FIG. 31.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An intake manifold, comprising:
   a first inlet structured to receive pressurized intake air from a turbocharger;
   a second inlet structured to receive exhaust gas recirculation gas from an exhaust gas recirculation system;
   a third inlet structured to receive fuel from a fuel line;
   a plurality of outlets structured to be fluidly coupled to an engine; and
   an intake manifold passage extending between each of the first, second, and third inlets, and the plurality of outlets, the intake manifold passage shaped so as to cause at least two reversals in flow direction of each of the intake air, the exhaust gas recirculation gas, and the fuel through the intake manifold passage so as to improve mixing of each of the intake air, the exhaust gas recirculation gas, and the fuel.

2. The intake manifold of claim 1, wherein the intake manifold passage is "S" shaped.

3. The intake manifold of claim 2, wherein each of the plurality of drop-down runners have an equal length.

4. The intake manifold of claim 1, wherein the intake manifold passage defines a plenum, and further comprising a plurality of drop-down runners from the plenum to the plurality of outlets.

5. The intake manifold of claim 4, wherein the plurality of drop-down runners are configured to receive placement of port fuel injectors therein.

6. The intake manifold of claim 4, wherein the plenum is positioned above a center line of the plurality of outlets.

* * * * *